(12) United States Patent
Dempster et al.

(10) Patent No.: US 8,423,441 B2
(45) Date of Patent: Apr. 16, 2013

(54) MULTIPLE BALANCE STATE ACCOUNT PROCESSING

(75) Inventors: James R. Dempster, Mequon, WI (US); Glenn R. Sonsalla, Brookfield, WI (US)

(73) Assignee: Metavante Corporation, Milwalkee, WI (US)

( * ) Notice: Subject to any disclaimer, the term of this patent is extended or adjusted under 35 U.S.C. 154(b) by 0 days.

(21) Appl. No.: 13/337,755

(22) Filed: Dec. 27, 2011

(65) Prior Publication Data

US 2012/0221447 A1    Aug. 30, 2012

Related U.S. Application Data

(63) Continuation of application No. 12/778,700, filed on May 12, 2010, now Pat. No. 8,108,280, which is a continuation of application No. 10/327,803, filed on Dec. 20, 2002, now abandoned.

(51) Int. Cl.
*G06Q 40/00* (2012.01)

(52) U.S. Cl.
USPC ............................................. 705/35; 705/42

(58) Field of Classification Search ............ 705/35, 705/42
See application file for complete search history.

(56) References Cited

U.S. PATENT DOCUMENTS

| 7,117,172 B1 * | 10/2006 | Black ............................. 705/35 |
| 2004/0073511 A1 * | 4/2004 | Beaumont et al. ............. 705/42 |

* cited by examiner

*Primary Examiner* — Samica L Norman
(74) *Attorney, Agent, or Firm* — Finnegan, Henderson, Farabow, Garrett & Dunner, LLP

(57) ABSTRACT

A computer based system and method for processing financial accounts. Each account is defined by multiple daily account balance records. Each daily account balance record is defined by a daily account balance record posting state that defines the types of transactions that may be posted to the daily account record balance at any one time. The various daily account balance records defining a single account may have different daily account balance record posting states, thereby allowing different types of transactions for different account days to be posted to the same account simultaneously. The resulting account processing system and method provides customers greater flexibility in transferring money between accounts and provides banking entities greater flexibility in account processing timing and reducing operational costs.

21 Claims, 18 Drawing Sheets

MULTIPLE BALANCE STATE ACCOUNT PROCESSING

CROSS-REFERENCE TO RELATED APPLICATION

This application is a continuation of U.S. application Ser. No. 12/778,700 (allowed) filed May 12, 2010 now U.S. Pat. No. 8,108,280 which, itself, is a continuation of U.S. application Ser. No. 10/327,803 (abandoned) filed Dec. 20, 2002, the entire contents of each of which is incorporated by reference.

FIELD OF THE INVENTION

This invention pertains generally to the field of automated computer based financial accounting, and more particularly to automated computer based methods and systems employed by financial and related institutions to update and maintain accurate financial account balances as those account balance are affected by a variety of account transactions and other activities.

BACKGROUND OF THE INVENTION

One of the most basic services provided to business and individual customers by financial institutions such as banks and related entities (hereinafter referred to generically as banking entities) is the maintenance of customer accounts. Customers may establish a variety of different customer accounts with a variety of different banking entities. Such accounts may range in type from simple deposit accounts (e.g., checking and savings accounts, wherein the account represents cash assets of the customer being held by the banking entity), to credit or debt accounts, to complicated brokerage accounts (wherein the account may represent a variety of different asset or debt vehicles of varying cash value being held or managed by the banking entity for the customer). A single customer may have a variety of different accounts, of the same or different types, with the same banking entity. A simple schematic illustration of the information flow between an exemplary banking entity 20 and customers 22 with regard to accounts 24 established by customers 22 with the banking entity 20 is provided in FIG. 1.

A key feature of most customer accounts 24 with a banking entity 20 is the ability of a customer 22 to affect a variety of transactions that alter the account balance. For example, for a conventional cash deposit account, a customer may initiate daily account transactions 26 as desired. Such account transactions 26 may include, for example, conventional deposits to or withdrawals from the account assets. Such deposit and withdrawal transactions 26 may be initiated using various conventional mechanisms, such as a written paper check, automatic teller machine (ATM) transaction, electronic funds transfer (EFT), etc.

More sophisticated individual and commercial customers 22 also may transfer money between various accounts 24 owned by the customer 22 and held by the same banking entity 20 by the use of a type of transaction hereinafter referred to as a sweep 28. Sweeps 28 may be executed automatically by the banking entity 20 based on sweep rules 30 that are established by the customer 22 with the banking entity 20. For example, a customer 22 may set up a sweep rule 30 whereby a set or variable amount of funds are transferred between selected accounts 24 on particular pre-selected days, at pre-selected times every day, or if certain conditions are met, such as if an account balance exceeds or falls below a pre-established threshold. The amount of funds to be swept between accounts 24 may be a fixed or variable amount defined by the sweep rules 30 that are established by the customer 22. For example, a customer 22 may set up a sweep rule 30 whereby sufficient funds are swept between accounts 24 to maintain a desired balance (e.g., a zero balance) in one of the accounts 24 after the sweep 28 is performed.

A customer also may establish sweep rules 30 with a banking entity 20 where the customer has an account whereby funds are transferred automatically or swept 29 from the customer's account at one banking entity to an account (another account of the same customer or an account belonging to a different customer) at another banking entity. Such inter-banking entity sweep rules 30 are similar to intra-banking entity sweep rules 30, in that the conditions and character of the transfer 29 may be predefined such that the sweep 29 can occur automatically without specific action by the customer at the time of the transaction. However, in this case, the sweep 29 is between accounts at different banking entities, rather than between accounts held within the same banking entity 20.

In addition to customer initiated or defined daily transactions 26 and sweeps 28, 29, the banking entity 20 itself may take actions that affect customer account balances. For example, the banking entity 20 may apply interest payments and/or service charges 32 to customer accounts 24 based on pre-defined conditions (e.g., account balance, time of the month etc.), as specified in the customer's agreement with the banking entity 20.

Daily customer transactions 26, sweeps 28, 29, interest payments and service charges 32, and the like all affect the customer's account balance. Good business practices, as well as government regulations, require that the account balance for each account 24 maintained by the banking entity 20 be updated accurately to reflect these various account activities which affect the account balance. The banking entity 20 generates account balance and transaction information reports, known as statements 34, that provide an accurate report of account balances and transactions affecting those balances to their customers 22. Such statements may be provided to customers 22 on a periodic basis (e.g., monthly for individual customers to as often as daily for certain business customers), or on-request, including in real-time. In addition, the banking entity 20 itself must maintain an accurate accounting of all of its customer accounts in aggregate. The banking entity may generate a daily report of the banking entity's position, taking into account all customer account balances.

All modern banking entities employ computer based accounting systems to maintain and update customer account balances and to generate account balance and transaction statements for customers. (A third party technology service provider often provides the account processing for the banking entity.) Such computer based accounting systems post or apply transactions which affect account balances to the customer accounts affected thereby to maintain accurate and official account balances. Transactions affecting account balances must be "final posted" or accounted for by the banking entity at least once per business day. In current computer based systems for account processing, the final posting of daily transactions (e.g., deposits and withdrawals) to accounts, the pre-established sweeping of funds between accounts within the banking entity or between banking entities, the application of interest and service charges to accounts, and the generation of account balance and transaction statements, as well as general account maintenance functions, typically occur once per day during an end of day account processing period. Typically, the final or official posting for all of the accounts maintained by a particular banking entity occurs during a single end of day account processing period. All paper-based transactions (e.g., checks) affecting account balances are accumulated for batch posting during the end of day account processing period. Daily electronic transactions (e.g., teller, ATM transactions, point of sale (POS) transactions, or Automatic Clearing House (ACH) transactions) may either be posted to the customer's account in real-time or accumulated for later batch posting with other transactions during the end of day account processing period. If the electronic transactions are accumulated for later batch posting, a secondary unofficial database of account balances may be maintained by the banking entity. Account balances in the secondary database are updated in real-time in response to electronic transactions, thereby to provide an unofficial current account balance to customers. The secondary database is updated daily with the results of the daily end of day batch processing for the account, which takes into account non-electronic and other activities affecting the account balance.

Under currently employed account processing systems and methods, end of day batch account processing occurs each day at some pre-scheduled time for groups of accounts (often all of the accounts) held by a banking entity. An exemplary general sequence of the account processing which occurs during the end of day batch account processing period is as follows:

1. Stop day/Start end of day. All accounts being processed are closed to daily transactions for Day N. Daily transactions affecting an account balance which are received after stop day will be considered next day transactions and will not be posted until the next day's processing.
2. Pull in transactions. All customer account transactions (daily transactions) for Day N are gathered for processing.
3. Process sweeps between accounts. Pre-established sweep rules are applied to the accounts being processed and funds are transferred automatically between accounts based on those rules.
4. Post transactions. Day N transactions are posted to the accounts being processed.
5. Apply interest and service charges to accounts based on account balances at this point.
6. Generate account balance and transaction statements for Day N.
7. Open accounts for Day N+1 daily transaction processing.

It should be noted that not all of the steps listed above necessarily are applied to all accounts being processed every day. Also, many modifications and variations in the ordering of the steps listed above and in the way each step is performed have been developed to improve account processing efficiency. Such modifications may include, for example, grouping together related accounts for processing together and looking ahead in the process for certain accounts or groups of related accounts to estimate the effect of steps later in the process on the account balances established by steps earlier in the process. Furthermore, the handling of other occurrences not listed above, but that may affect account balances, also are performed during the end of day batch account processing period. Examples of such other occurrences affecting account balances include exceptions (unusual occurrences affecting account balances, such as overdrafts) and adjustments (the adjustment of account balances to correct past day's posting errors, such as when a transaction was posted in error to the wrong account on a previous processing day). The main point is that in currently employed automated account processing systems and methods all of the steps necessary to final post to account balances all of the activities that may affect the account balances typically are performed during a single daily batch account processing period.

Note that the first step to occur during the end of day batch account processing period is the effective closing, for daily transaction processing (Day N), of all of the accounts being processed (e.g., typically all of the banking entity's accounts). During the end of day batch account processing period, all of the accounts being processed are effectively closed to all daily transactions affecting the account balances. After the end of day batch account processing is complete, all of the accounts being processed are opened up to daily transactions once again, but only for next day transactions (for Day N+1). To reduce the effect on customers of their accounts being effectively closed during the end of day batch account processing period, the end of day processing of accounts typically is performed during a period of likely low customer account activity, such as in the middle of the night. However, in a global economy there is no such quiescent period.

Although less typical, there currently also exist automated account processing systems and methods which operate continuously, rather than in a batch processing mode. In such "real-time" account processing systems and methods, final posting of all transactions affecting account balances occurs as each transaction is received. Such continuous systems typically are employed by banking entities serving a limited client base and offering limited types of customer transactions affecting account balances. It should be noted that in such current continuous account processing systems and methods each account is, at any one time, open for posting of daily transactions for a single given day and closed for all other days. Thus, all transactions are posted as daily transactions on the day they are received. (In such systems and methods an end of day process is implemented wherein all of the accounts for a given banking entity are closed for daily transaction posting for one day and opened for the next day. Interest and service charge transactions and account balance and transaction statement generation also may occur during this end of day processing period.) Thus, although such real-time account processing systems and methods do not accumulate daily transactions for posting during a single end of day batch processing period, since each account is open for posting of daily transactions only for one day at any one time, it is clear that most of the limitations of current automated end of day batch account processing systems and methods, to be discussed in more detail below, apply also to such current real-time account processing systems and methods.

In the current methods of automated account processing, at any one time an account is open for processing of transactions for a given day and closed for all other days. Once an account is closed for account processing for a given day (Day N), no more transactions to or from that account (except for adjustments for past posting errors) may be made for that day. This can adversely affect a customer's ability freely to move funds between accounts such that funds are available in an account where and when the customer wants them to be.

An example of the limiting effect of current account processing systems and methods as applied to transactions between accounts in a global economy context will be described now with reference to the time line diagram presented in FIG. 2. Consider a customer with international operations who has accounts in Hong Kong 36 and Los Angeles 38 (e.g., with different national organizations of the same global banking entity). When the Hong Kong banking entity closes accounts for end of day processing on Tuesday (e.g., at midnight local time) all subsequent daily transactions involving the Hong Kong account 36 will be Wednesday transactions. However, the Los Angeles banking entity still is open for Tuesday transactions at this time. If, during Tuesday end of day processing at Hong Kong, pre-established sweep rules indicate that Tuesday funds should be swept 40 from the Hong Kong account 36 to the Los Angeles 38 account, such a transaction 40 could be accomplished under the current systems and methods, as the Los Angeles account 38 is still open for Tuesday transactions. However, such a transfer cannot occur the other way. A funds transfer 42 during normal business hours on Tuesday in Los Angeles from the Los Angeles account 38 to the Hong Kong account 36 cannot be done, because at this time the Hong Kong account 36 is closed for Tuesday daily transactions and open only for Wednesday transactions. Likewise, if the Tuesday end of day account processing in Los Angeles 38 (e.g., starting at midnight Los Angeles time) indicates that a sweep 44 of Tuesday funds into the Hong Kong account 36 is desired, such a transfer 44 cannot occur under the current systems and methods, because the Hong Kong account 36 is closed to Tuesday transactions. Funds in the Los Angeles account 38 on Tuesday after the Hong Kong account 36 has closed to Tuesday transactions may be transferred 46 from the Los Angeles account 38 to the Hong Kong account 36 after Tuesday end of day processing in Los Angeles 38, when both the Hong Kong 36 and Los Angeles 38 accounts are open for Wednesday transactions. This limitation restricts the use of funds deposited on Tuesday in Los Angeles 38 from being used to cover debt obligations incurred in Hong Kong 36 on Tuesday.

As a further example, consider a business operation customer of a banking entity with operations twenty-four hours a day throughout the United States. The customer has local accounts for various branches of its operation with banking entity branches throughout the country. The customer's headquarters are located in New York, and the customer would like all daily revenues from throughout the country to be transferred to their New York account at the end of each day. However, revenues received late in the day at the Los Angeles branch of the customer's operation may be received after end of day processing of the customer's New York account has begun, that is, after the New York account is closed to further daily transaction activity for the given day. Under current account processing systems and methods, such funds deposited in the customer's Los Angeles branch account late on Day N could not be transferred to the customer's New York account until Day N+1. A similar situation occurs whenever it is desired to transfer funds between accounts that are open to different day transactions due to different timing of end of day processing. This situation could occur even if it is desired only to move funds between accounts held at banking entities in the same time zone, if the accounts are on different end of day processing schedules, which often may be the case. The problem is simply exacerbated for banking entities that are spread farther apart geographically and, therefore, in time.

The ultimate effect of the situation described in the foregoing examples is that funds which should be available for customer use are not, due merely to the current systems and methods of automatic account processing. For example, with respect to the first example presented above, funds deposited by the customer into the Los Angeles account on Tuesday after Tuesday end of day account processing has begun in Hong Kong cannot be transferred to the Hong Kong account until Tuesday's processing for Los Angeles is complete, with the result that funds will not arrive for use by the customer in Hong Kong until Wednesday evening. If the customer needed additional funds in Hong Kong on Tuesday he could not make use of all of the Tuesday funds available in Los Angeles. The customer would have to find or use other funds in Hong Kong as needed. The customer may thus be forced to have available two dollars (one in Hong Kong and one in Los Angeles), where only one would be needed if the customer were not prevented by the account processing systems and methods employed to transfer same day funds between the customer's accounts.

The foregoing examples illustrate the effect of a key limitation of current account processing systems and methods. This limitation is centered in the need for accounting systems to apply transactions that are derived at multiple intervals of an account's processing cycle against an account balance that is singular in its status definition. That is, the account's balance has a singular defined status of "available for transaction posting for a given day and closed for transaction posting for all other days" in current account processing systems. However, certain transactions affecting account balances for a given day may be generated after determination of the account's closing balance for the day (i.e. after all available activity at a pre-scheduled processing time has been accumulated for a given business day). As illustrated by the examples above, such transactions may include customer requested or pre-scheduled account to account money transfer transactions that occur after a receiving account has been given a status of closed for transaction posting for the given day. These transactions which occur after the closing of transaction posting for a given day (Day N) generally cannot be applied to the account's balance until the next processing day (Day N+1). This transaction event/balance status dilemma also occurs when accounts are grouped in complex funds management arrangements that cross legal entities (chartered banks) and time zone boundaries. The event that governs processing of these funding relationships is the commonly defined account end of day account processing period. This end of day processing event is most often implemented at the institution level (e.g. all accounts for a banking entity are posted in a single "end of day" event at the same time) in current core accounting systems. With this operational system implementation, related accounts separated by even a single time zone, or even within the same time zone and on different end of day processing schedules, make posting of transfer transactions determined using account closing balances operationally unfeasible in most current accounting systems.

A further limitation of current automated account processing systems and methods is the limited flexibility that such systems and methods provide for reducing operational processing costs. As discussed above, under current systems and methods for automated account processing, all transactions and other activities affecting account balances are posted to a large group of accounts (e.g., all of a banking entity's accounts) during an end of day batch processing period. As also discussed above, all accounts being processed effectively are closed entirely to daily transactions during this processing period. To minimize the period during which the accounts are closed, every effort is made to reduce the total end of day account processing time. This may be achieved both by maximizing processing efficiency and by maximizing available processing resources to process a large number of transactions for a large number of accounts in as brief a period of time as possible. The additional processing resources required to minimize processing times for a large number of transactions and accounts also increases operational costs. Computer resources, and resulting operating costs, may be reduced if a system and method for automated account processing provided more flexibility in the time periods over which different types of transactions might be posted to different accounts, rather than requiring all transactions to be posted to all banking entity accounts in the shortest possible time, as required by current systems and methods.

A more conceptual limitation of current automated account processing systems and methods is the anomalies that can arise from practical compromises which result from the attempt to fit in additional closing transactions on top of ending balances calculated during the end of day account processing period in order to reflect such transactions in next day opening positions. For example, in current account processing systems and methods, as discussed above, service charges and interest are calculated against ending balances for a given Day N and posted to the given Day N balance during end of day account processing for the given Day N. Thus, the interest and service charge calculations that are to be based on the end of day closing balance for a given Day N actually affect the given Day N closing balance on which they should be based. Interest and service charge entries would be handled more accurately by the account processing system as opening transactions for the next day (Day N+1). However, in the current systems and methods for automated account processing, all activity affecting the next Day N+1 balance is not posted until the day is over. Clearly, a customer would not accept a delay in posting of interest based on an account balance for Day N until after the next Day N+1 is over. Similarly, the banking entity would not want to delay charging service charges to an account balance for Day N until the next Day N+1 was over.

What is desired, therefore, is an automated account processing system and method which overcomes the limitations of current account processing systems and methods, in which virtually all account activity final posting occurs during an end of day batch account processing period during which all daily transaction processing for that day is closed and after which all daily transactions are processed as next day activity. The desired automated account processing system and method preferably provides greater flexibility in the time periods over which various transactions affecting account balances may be posted to various accounts.

SUMMARY OF THE INVENTION

The present invention provides an application processing system solution to a key limitation of current account processing systems and methods. The present invention provides a solution that utilizes an active and expanded definition of the account balance posting state or status, as well as a processing model for intelligent posting of transactions based on awareness of the account posting states and a date and type characteristic assigned to each transaction affecting an account balance. Thus, in accordance with the present invention, each customer account maintained by a banking entity may be defined by multiple account balance posting states which define which types of transactions, for which days, may be posted to the account at any given time. In accordance with the present invention, each customer account may have multiple account balance records, such as separate account balance records for each business day. Each customer account processed in accordance with the present invention is thus not limited to being open for processing transactions for a single day and closed for all other days. The resulting flexibility of account activity posting in accordance with the present invention allows customers more flexibility in transferring funds between accounts. The resulting flexibility of account activity posting in accordance with the present inventions also provides more opportunities to spread out the processing of selected subsets of the accounts held by a banking entity and/or to spread out the processing of different types of account activities affecting those accounts, rather than posting all transactions for all banking entity accounts at the same time, thereby providing greater opportunities to control computational resources and operational costs.

Conventional accounting systems generally define account activities, that is, actions that affect an account, with several categorizations. The most common categories include monetary activities and non-monetary activities. Monetary activities affect an account's balance position (debits and credits). Non-monetary activities establish or modify non-balance information attached to an account (owner name and address, account status, etc.). Activities in both of these categories also most often are assigned an effective date, if the transaction is not for the current day, to categorize them further, e.g., as a current day or previous day (back dated) activity, when applying the activity to the account and/or its balance position.

In accordance with the present invention, each activity that may affect an account balance is assigned both a date and a further type characteristic. The date defines the date of the activity, e.g., the date for the transaction (which may be a past, present, or future date). The type characteristic defines the type of account activity. Exemplary type characteristics which may be assigned to account balance affecting transactions in accordance with the present invention include:

Daily transaction entry;
Opening transaction entry;
Closing transaction entry;
Adjustment transaction entry.

Additional and/or other type characteristics also may be assigned to account balance affecting transactions in accordance with the present invention. The transaction type characteristics employed may depend on the types of transactions and other activities expected to affect the underlying account. This, in turn, may depend on the type of the underlying account itself (e.g., a deposit account versus a brokerage account).

The type characteristic that is to be assigned to any given transaction or other account activity may be defined by the account customer and/or banking entity. For example, for conventional deposit account type activities, interest payments and service charges, pre-established to be based on a start of day account balance, may be typed as opening transaction entries. Traditional electronic and paper deposit and withdrawal transactions, as well as intra-day sweeps, may be typed as daily transaction entries. Sweeps or other transactions pre-established to be based on an end-of-day account balance may be typed as closing transaction entries. Activities that effect corrections to erroneous postings to past day's account balances may be typed as adjustment transaction entries.

In accordance with the present invention, each customer account, to which the various account balance affecting transactions described above are applied, is defined by an account record that includes separate account balance records for each business day (or other pre-defined time period). Each daily account balance record includes daily account balances (e.g., opening and end-of-day balances), an account balance state providing an indication of the state of the current daily account balance (e.g., the degree of finality of the balance), as well as a daily account balance posting state for the daily account balance record. The same basic account record structure, i.e., including separate account balance records with separate daily account balance posting states for each business day, may be employed in accordance with the present invention regardless of the account type to be processed.

The account balance state indicates the condition of the daily account record balance. Exemplary account balance states which may be assigned to each daily account balance record in accordance with the present invention include:

Anticipated. What the final balance will be absent further entries, where further entries are possible.

Final. Final balance results. A final balance may be reported externally as the closing position of the account. The final balance is the official account balance for the account owner (customer) and the account holder (banking entity) for that day, and may be included in statement and general ledger records.

Adjusted. Final balance as adjusted by after-the-fact adjustments for late or corrected entries. Such adjustments affect the effective value of daily balances for purposes such as fees and earnings.

Additional and/or other daily account balance states may be assigned to a daily account balance record in accordance with the present invention. The account balance state for any given daily account balance record may be different from the account balance states of other daily account balance records of the same account.

The daily account balance posting state for each daily account balance record defines the types of transactions that may be posted to that daily account balance record at any given time. The daily account balance posting state for each daily account balance record may take on one of a plurality of possible states. Rather than merely defining the account as "open" or "closed" for posting daily transactions for any given day, the possible daily account balance posting states preferably are selected to allow a more graduated application of transactions and other activities effecting account balances to the account. Exemplary possible daily account balance record posting states may include:

Open for posting opening entries.

Open for posting daily entries.

Closed for posting opening and daily entries; open for posting closing entries.

Closed for posting opening, daily, and closing entries; open for adjustments.

Closed for posting opening, daily, and closing entries; closed for adjustments.

Additional and/or other daily account balance record posting states may be assigned to a daily account balance record in accordance with the present invention. The possible posting states which a particular daily account balance record may be assigned in accordance with the present invention may depend on the type of account to be processed in accordance with the present invention as well as the types of transactions expected to be processed. The exemplary possible daily account balance record posting states listed above may be appropriate for a conventional deposit type account to which the opening, daily, closing, and adjustment transaction entries described above are to be applied. The daily account balance posting state for any given daily account balance record of an account may be different from the daily account balance posting state of other daily account balance records of the same account.

In accordance with the present invention, an account record defined by multiple daily account balance records as described above is established for each financial account to be processed. Each of the multiple daily account balance records of each account is defined by one of a plurality of selected account balance posting states that defines which types of account activities may be posted to that daily account balance record at any given time. Thus, in accordance with the present invention, a customer account is not defined by a singular status definition (open or closed) but by multiple balance states which define the processing which may be applied to the account for each day. This account record structure of the present invention may be contrasted with the account record structure employed in traditional account processing systems. Such conventional systems most often define a base structure for an account record that is used to manage all account definition, balance, and status information. This base account structure is updated directly as the result of transaction activity and is either open or closed for posting any particular transaction activity. Having account balance information as part of this account record limits transaction posting against that balance to the same open/closed restriction. However, the use of a type characteristic identification for transactions coupled with an account balance record posting state definition in accordance with the present invention provides a much more flexible and defined transaction processing capability.

In accordance with the present invention, an account state governor or controller controls the current balance state and account balance posting state of each daily account balance record. Thus, the account state controller establishes which types of transactions may be posted to a given daily account balance record at any one time, by setting or changing the account balance posting state for each daily account balance record, and initiates a balance updating process to post transactions to the appropriate daily account balance record based on the transaction type and date and the daily account balance posting state. Account processing performed by a multiple balance state account processing system in accordance with the present invention thus relies on the account state controller to define the state of each daily account balance record such that transactions and other activities of the appropriate type may by applied properly to the account's daily account balance records.

The account state controller preferably selects from a plurality of available posting states to assign an account balance posting state to each daily account balance record. As discussed above, the account balance posting state assigned to each daily account balance record defines the types of transactions that may be posted to that daily account balance record at any given time. Different daily account balance records within a single account may be assigned different or the same account balance posting states by the account state controller. Thus, the account state controller may assign account balance posting states to the daily account balance records of an account such that multiple daily account balance records of the same account are open simultaneously for posting of the same or different types of transactions or other activities thereto.

The account state controller determines the account balance posting state of each daily account balance record based on account state business rules established for the account by the customer and/or the banking entity. The business rules establish the daily account balance posting state definitions (which transactions may be posted to a daily account record balance when a particular account balance posting state is assigned to that daily account balance record) as well as the events that trigger the assignment of or change in the account balance posting state assigned to a particular daily account balance record. The account state business rules may define several categories or definitions for event triggers that drive the account state controller to establish or change the posting state of a daily account balance record at any given point in time. Exemplary business rule categories for defining event triggers that drive the account state controller to establish or change account balance posting states may include:

Date/Time Initiated—Business rules that initiate event triggers for daily account balance record posting state changes based on specific day, date, or time-of-day conditions (e.g., change daily account balance record posting state to "open for posting daily entries" at midnight).

Conditional/Threshold Initiated—Business rules that trigger events for daily account balance record posting state changes based on the value of defined system data attributes or the occurrence of a defined condition (e.g., change daily account balance record posting state to "closed for posting closing entries" after completion of end of day batch postings).

Operator Initiated—Business rule conditions allowing banking entity or customer operators to override other event triggers to initiate a daily account balance record posting state change for exceptional processing conditions (e.g., change daily account balance record posting state to "open for adjustments" to accommodate posting an adjustment to the daily account record balance after the daily account balance record has otherwise been closed to all postings).

Various types of business rules employed by the account state controller to trigger the establishment or change of daily account balance record posting states may fall into one or more of the listed categories. Moreover, an account state controller in accordance with the present invention may base the triggering of the establishment or change of account balance record posting states on business rules which may not fall into one of the exemplary business rule categories listed above.

The account state controller processes each received transaction or other activity affecting an account balance based on the date and type characteristics assigned to the transaction or other activity (as well, of course, as the specific account to which the transaction or other activity refers). If the date characteristic of the received transaction or other activity is for a future day, or any other day, for which a daily account balance record has not been established for the affected account, the account state controller may initiate the establishment of a daily account balance record for the account for that day. In such a case, the account state controller may be called upon to establish an account balance posting state for the newly established daily account balance record, based on the account state business rules in effect for the account. If a daily account balance record has already been established for a received transaction or other activity, the account state controller compares the activity type of the transaction or other activity to the assigned daily account balance record posting state for the date of the transaction or other activity to determine if the particular transaction or other activity may be posted to that daily account balance record at that particular time. If the transaction or other activity cannot be posted to the particular daily account balance record at that time, because of the current daily account balance record posting state, the account state controller may attempt to post the transaction or other activity to another daily account balance record of the same account (e.g. the daily account balance record for the next business day) or may reject the transaction or other activity, thereby forcing a change in the daily account balance record posting state to occur before the transaction can be posted to the account. The account state controller initiates the update of daily account record balances as appropriate to reflect the effect of successfully posted transactions and other activities thereon.

Overall system account processing in a multiple balance state account processing system in accordance with the present invention is controlled by an account processing event manager. The account processing event manager controls the timing and sequence of account transaction capture and processing as well as other activities affecting account balances. Through the use of the account processing event manager, transactions affecting account balances may be processed as they are presented to the system (continuous transaction processing) or captured and logged for later batch processing, as initiated by the account processing event manager.

A great advantage of a multiple balance state account processing system and method in accordance with the present invention over conventional automated account processing systems and methods is the much greater flexibility that is made available to customers to transfer funds between accounts. Unlike in conventional systems, where an account is open for posting of one day's transactions and closed to postings for all other days at any one time, an account processed in accordance with the present invention may take on multiple balance states simultaneously, thereby allowing the posting of certain transactions to the account for one business day while the account is also open for the posting of other transactions to the account for another business day. Thus, for example, an account processed in accordance with the present invention may simultaneously be closed to posting of regular daily transactions for Day N, open for posting of end-of-day sweep transactions for Day N, and open for posting of regular daily transactions for Day N+1. As applied to the example given previously, under this scenario a customer's account in Hong Kong may be open to the posting of daily transactions for local activity on Wednesday while still being open for the posting of a sweep of funds from the customer's Los Angeles account for Tuesday. Several other exemplary applications of the present invention to various scenarios that show how the present invention allows customers great flexibility in moving funds between accounts, to keep money where the customer wants it when the customer wants it, will be presented below.

The flexibility of a multiple balance state account processing system in accordance with the present invention to define which transactions may be posted to which daily account balance records at specific times also provides greater opportunities for controlling processing and other operational costs over conventional systems and methods in which all transactions for all accounts of a banking entity are processed during the same end-of-day batch account processing period. Such other advantages of a multiple balance state account processing system in accordance with the present invention include the following.

Transaction processing flow control ranging from continuous posting of account transaction activity to multiple or single batch transaction releases per day is feasible with the present invention. For example, the account processing event manager could be configured to process account transaction activity as soon as items are presented, or it can manage the release of collected transaction activity records on a scheduled (time-of-day) basis. This type workload definition allows transaction processing to be spread throughout the business day, offering greater opportunity to control operational costs.

The present invention provides the account processing system the ability to drive daily account end-of-day processing at a more granular level (customer, account, account group) as opposed to the banking entity or processing group level account end-of-day processing execution restrictions of current day accounting systems. This type of processing flow flexibility offers significant opportunities to control operational costs by expanding the time frame available to execute account end-of-day processing activities.

The present invention provides the ability to define more dynamically the order of common processing tasks within a daily account end-of-day processing event. As an example, the account processing event manager can be configured to execute money transfer, interest, and service charge end-of-day activities in a number of different sequences, calculate interest on the account balance, calculate account service charges, and finally process money transfers based on the resulting account balance position. Current day account processing systems often offer a predefined sequence for these common end-of-day activities.

Further objects, features, and advantages of the present invention will be apparent from the following detailed description, taken in conjunction with the accompanying drawings.

DETAILED DESCRIPTION OF THE INVENTION

The present invention will be described in detail with reference to the accompanying drawings which illustrate, via block diagrams, flow-charts, and exemplary timelines, the implementation and operation of an exemplary multiple balance state account processing system and method in accordance with the present invention. An exemplary system and method for multiple balance state account processing in accordance with the present invention is illustrated and described herein with reference to the exemplary embodiment of an automated computer based account processing system and method for processing conventional deposit type financial accounts. It should be understood, however, that the present invention is not limited to a system and method for the processing of deposit type accounts, and may be applicable to any type of financial or related account processing for which accurate account balance maintenance with maximum customer access and account processing flexibility is desired. Based on the detailed description and drawings provided herein, a programmer skilled in the art of computer based account processing systems will be able to implement a system and method for multiple balance state account processing in accordance with the present invention on conventional commercially available computer systems using conventional programming languages and techniques. The size, type, and processing power of the computers employed to implement the present invention may depend on the type and number of accounts to be processed, as well as required or desired processing times. Conventional optimization techniques used in current account processing systems and methods may be employed in combination with an account processing system and method in accordance with the present invention to optimize processing efficiency and reduce processing times.

Figure 1:
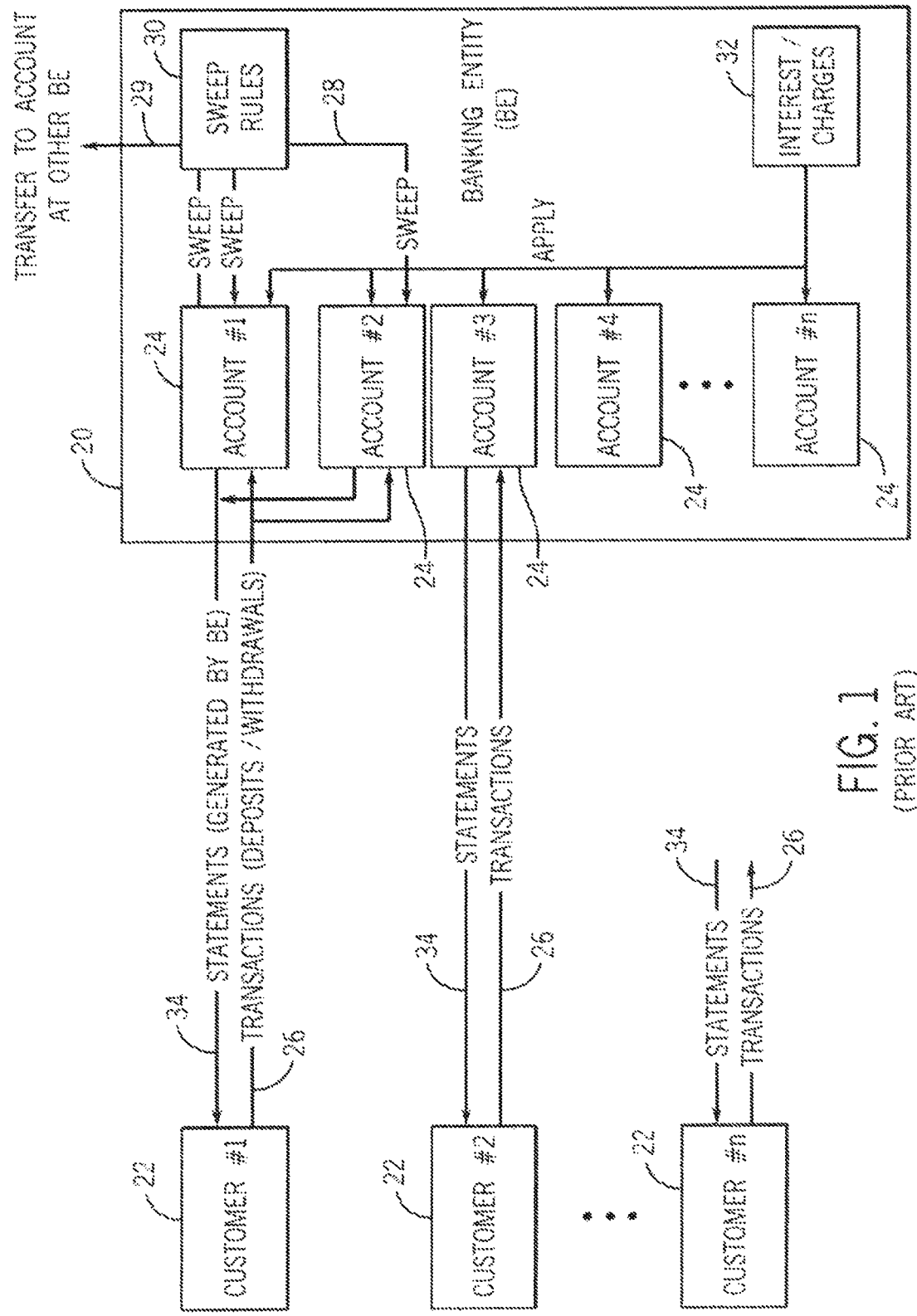
FIG. 1 is a simple schematic illustration of the information flow between a banking entity and customers with regard to accounts established by customers with the banking entity.
Figure 2:
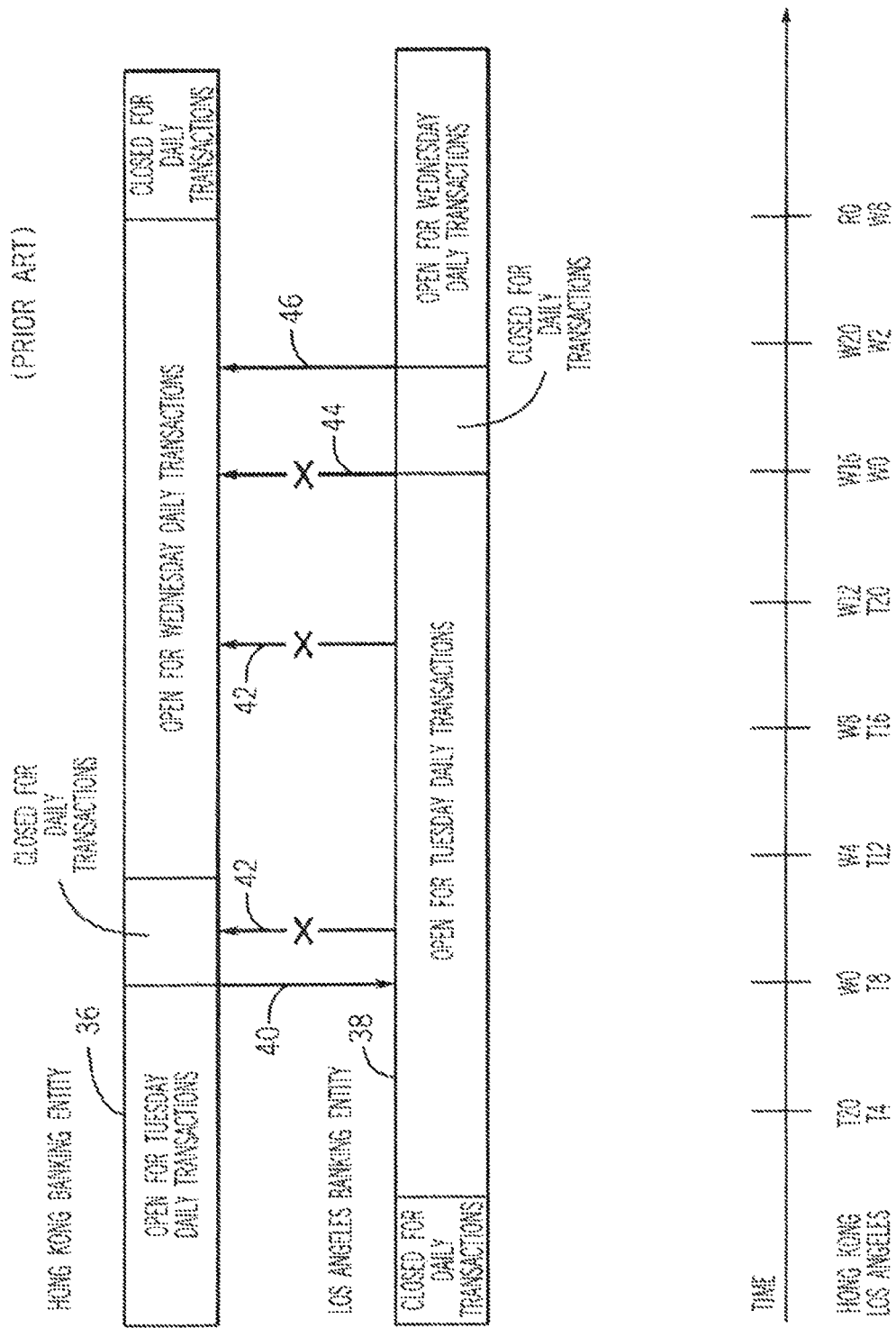
FIG. 2 is a timeline diagram illustrating the limiting effect of currently employed account processing systems and methods on transactions between accounts in a global economy context.
Figure 3:
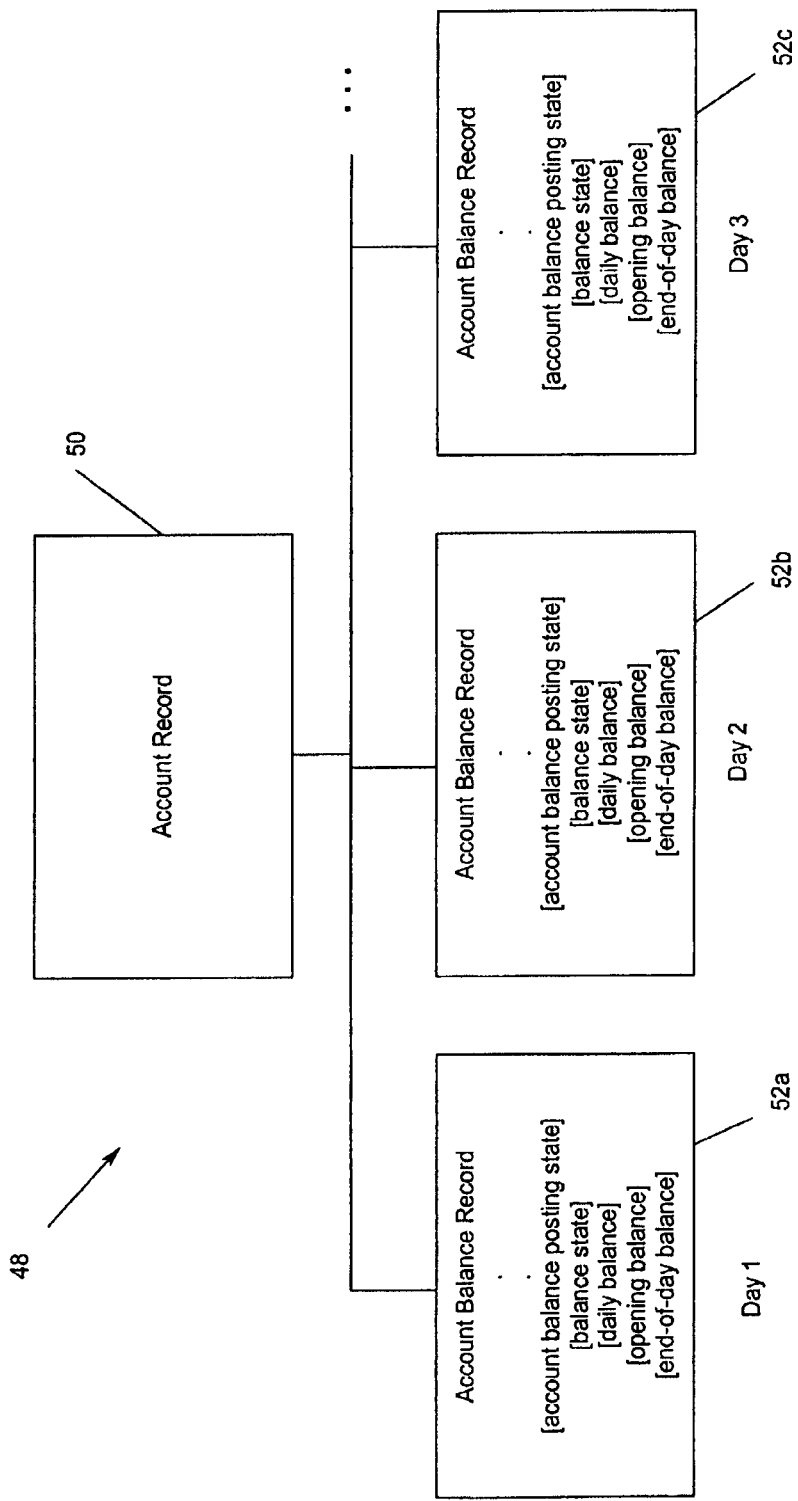
FIG. 3 is a schematic illustration of an exemplary account record structure that may be employed by a system and method for multiple balance state account processing in accordance with the present invention.

The present invention provides a system and method for automated account processing in which each individual customer account with a banking entity may be defined simultaneously with multiple account balance positions. As illustrated, for example, in FIG. 3, this may be achieved by the use of a data structure 48 for each customer account record 50 wherein the account balance is defined by a plurality of account balance records 52. The customer account record 50 defines the basic characteristics of the account, such as the account owner identification (e.g., name, address, social security number/tax identification number, etc.), type of account (savings, checking, etc.), related accounts with the banking entity, etc., in a conventional manner. In accordance with the present invention, the account balance is defined by the plurality of account balance records 52. A separate account balance record 52 is established, for example, for each business day, for each customer account. Thus, each account balance record 52 of a customer account will be referred to herein as a "daily" account balance record. However, it should be understood that a plurality of account balance records may be established for each customer account in accordance with the present invention for time periods other than business days, depending upon the particular needs and practices of the customer and banking entity.

Each of the plurality of account balance records 52 of a customer account in accordance with the present invention includes (daily) account balances for the business day (or other period) defined by the account balance record, as well as an account balance posting state. The daily account balance posting state defines the types of transactions or other activities that may be posted to the given daily account balance at any given time. Each daily account balance record 52 of a given account 50 may be assigned a different, or the same, daily account balance posting state. Thus, different types of transactions may be applied at the same time to each of the various daily account balances of a given customer account. As will be discussed in more detail below, this allows a customer to transfer funds into and out of an account with greater flexibility, while allowing the banking entity to maintain accurate account balances and improve account processing efficiencies.

Each daily account balance record 52 of a customer account in accordance with the present invention also may be defined by a daily account balance state. The daily account balance states defines the condition or state of finality of the daily account balance at any given time. Exemplary account balance states that may be assigned to each daily account balance record in accordance with the present invention include:

Anticipated. What the final balance will be absent further entries, where further entries are possible.

Final. Final balance results. A final balance may be reported externally as the closing position of the account for the given business day. The final balance is the official account balance for the account owner (customer) and the account holder (banking entity) for that day, and may be included in statement and general ledger records.

Adjusted. Final balance as adjusted by after-the-fact adjustments for late or corrected entries. Such adjustments affect the effective value of daily balances for purposes such as fees and earnings.

Additional and/or other daily account balance states may be assigned to a daily account balance record 52 in accordance with the present invention. The account balance state for any given daily account balance record 52 may be different from the account balance state of other daily account balance records of the same account.

Each daily account balance record of a customer account in accordance with the present invention may include other account balance or other information related to the given daily account balance, as may be required or desired depending upon the particular type of account and account processing to be performed on the account. For example, each daily account balance record 52 of a customer deposit account in accordance with the present invention may include opening and end-of-day account balances for the given day. The end-of-day account balance for any given daily account balance record may be the final daily balance after the daily account balance is closed to further postings (except, perhaps, for adjustments). The opening balance for any given daily account balance record for a given day (Day N) may be the end-of-day account balance for the previous day (Day N−1).

In accordance with the present invention, each transaction or other activity which may effect a daily account balance is defined by at least an account identifier (which identifies the account record 50 to which the transaction applies), a date (or other time period) identifier (which identifies the specific daily account balance record 52 to which the transaction applies), and a transaction type identifier. The transaction type identifier for each transaction may be selected from among a plurality of available transaction types, depending upon the type of account to which the transactions relate. The possible transaction types, i.e., the types of transactions which can affect the account balance, also define the available account balance posting states which may be assigned to each daily account balance record of a customer account. For example, exemplary transaction types for a deposit type account may include: daily transaction entries, opening (or start-of day) transaction entries, closing (or end-of-day) transaction entries, and adjustment transaction entries, as discussed above. In such a case, the possible daily account balance posting states include: open for posting daily entries, closed for posting daily entries, open for posting opening (start-of-day) entries, closed for posting opening (start-of-day) entries, open for posting closing (end-of-day) entries, closed for posting closing (end-of-day) entries, open for posting adjustments, and closed for posting adjustments, or any logical combination of these.

Any available transaction type may be assigned to a particular transaction affecting an account balance, based on rules established by the customer and banking entity with respect to the customer account. For example, conventional deposit account transactions initiated by a customer at the time of the transaction (e.g., checks, ATM transactions, POS transactions, etc.) may be assigned the daily transaction entry type identifier. As discussed above, sweeps are a particular type of transaction by which a transfer of funds can occur automatically, based on pre-established rules and conditions. Individual sweep transactions could be assigned different type identifiers depending upon the rules and conditions of the sweep. An automatic sweep out of an account of all of the funds accumulated in the account at the end of the day may by assigned the closing or end-of-day transaction entry type identifier. In contrast, a sweep of a fixed amount from an account that is pre-scheduled to occur mid-day may be assigned the daily transaction entry type identifier. The combined ability to define individual transactions by transaction types and to define which transaction types may be posted to which daily account balances of a customer account, by defining the account balance posting state of each daily account balance record, provides great flexibility in transferring funds between accounts, as will be discussed in more detail below.

Each transaction or other activity that may affect an account balance preferably also may be defined by a transaction amount, i.e., the value of the transaction or the amount by which a daily account balance is increased or decreased in response to posting of the transaction entry to the daily account balance record. The transaction amount may be either a fixed amount or a variable amount based on a calculation performed at the time that the activity is posted to the daily account record balance. For example, checks and ATM transactions typically will be fixed amount transactions. Sweeps may be fixed amount transactions or variable amount transactions based on pre-defined rules or conditions (e.g., a sweep out of sufficient funds to reduce an account balance to zero). Interest and service charge transactions typically are variable amount transactions (e.g., interest to be added to the account balance is calculated as a percentage of the account balance, service charges to be subtracted from the account balance may be waived if the account balance is sufficiently large, etc.).

Figure 4:
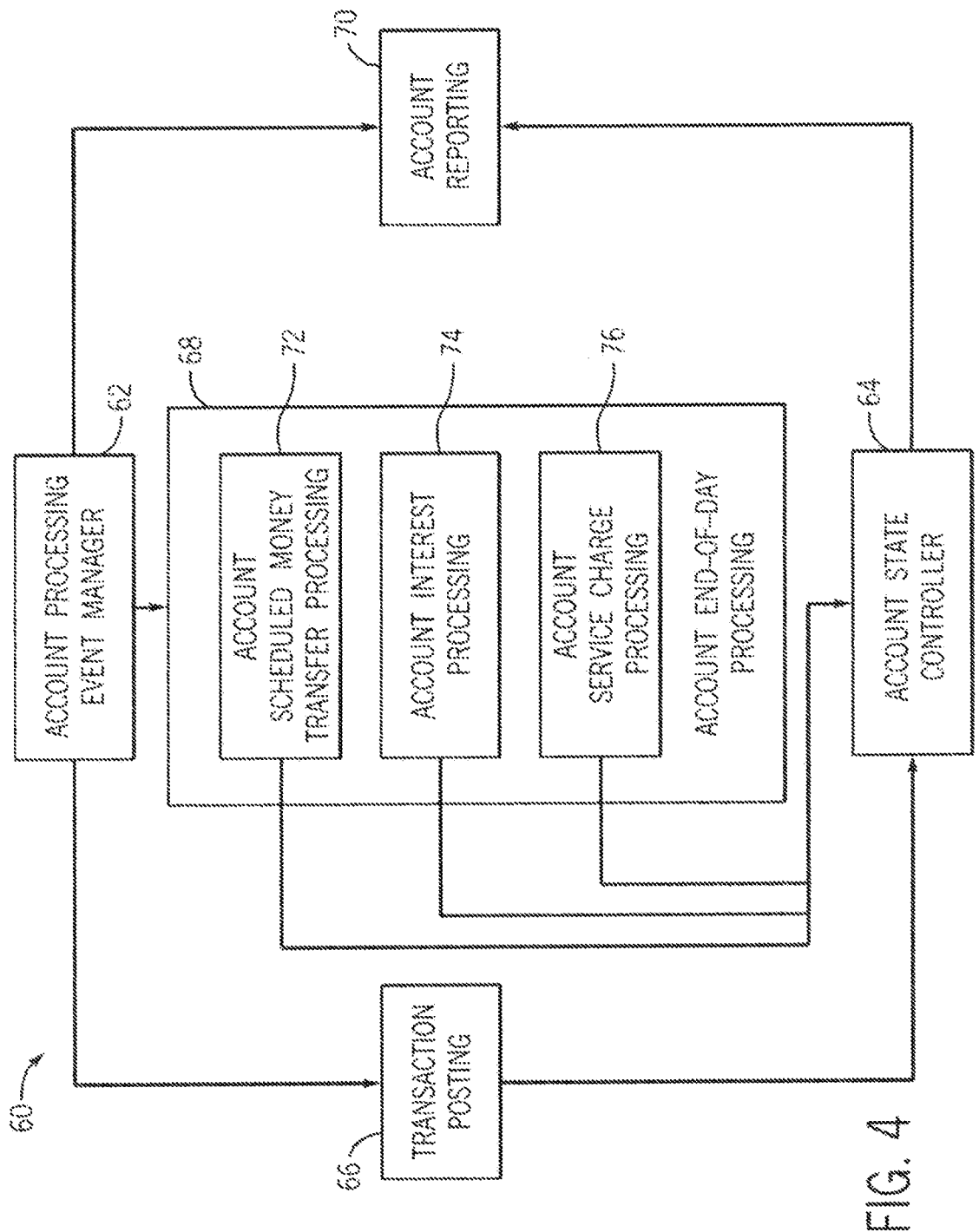
FIG. 4 is a schematic overview block diagram of an exemplary multiple balance state account processing system in accordance with the present invention, including an account state controller and an account processing event manager.

As illustrated in FIG. 4, in an exemplary multiple balance state account processing system 60 in accordance with the present invention, overall processing of account balance affecting transactions and activities may be controlled by two basic control processes, an account processing event manager 62 and an account state controller 64. The account processing event manager 62 controls the timing and sequence of account transaction capture and processing as well as of other activities either affecting or affected by account balances. For example, as illustrated in FIG. 4, overall account processing and reporting in a multiple balance state account processing system in accordance with the present invention may include transaction posting 66, account end-of-day processing 68, and account reporting 70. The account processing event manager 62 controls when each of these processes 66, 68, 70 is performed. Transaction posting 66 includes the posting of regular daily and other transactions to account balances. The account processing event manager 62 may control transaction posting 66 such that transactions affecting account balances are processed as they are presented to the system (continuous transaction processing) or such that transactions are captured and logged for later batch processing, as initiated by the account processing event manager 62. Account end-of-day processing 68 may include the processing of account balance affecting transactions, such as scheduled money transfer (end-of-day sweep) processing 72, account interest processing 74, account service charge processing 76, etc., as well as account maintenance activity not affecting directly the account balance. The account processing event manager 62 controls the initiation of such account end-of-day processing 68. The account processing event manager 62 also controls the initiation of account reporting 70, e.g., the generation of balance and transaction statements for customers and the banking entity.

Whereas the account processing event manager 62 controls the timing and sequencing of account processing, the posting of transactions and other activities to account balances may be controlled by the account state controller 64. The account state controller 64 controls the daily account balance by controlling two basic processes. First, the account state controller 64 controls the selection of the daily account balance posting state for each daily account balance record. Having defined the daily account balance posting state, the account state controller 64 controls the posting of transactions to the daily account record balances by comparing the type indication for each transaction to be processed with the daily account balance posting state for the day to which the transaction is to be posted to determine if the particular transaction can be posted to that particular daily account balance. As will be discussed in more detail below, this comparison is performed both for daily transaction posting 66 (either continuous or batch posting) as well as for account end-of-day processing transactions 68. The resulting daily account balance established by the account state controller 64 may then be used to generate an account report 70, at the initiation of the account processing event manager 62.

Figure 5:
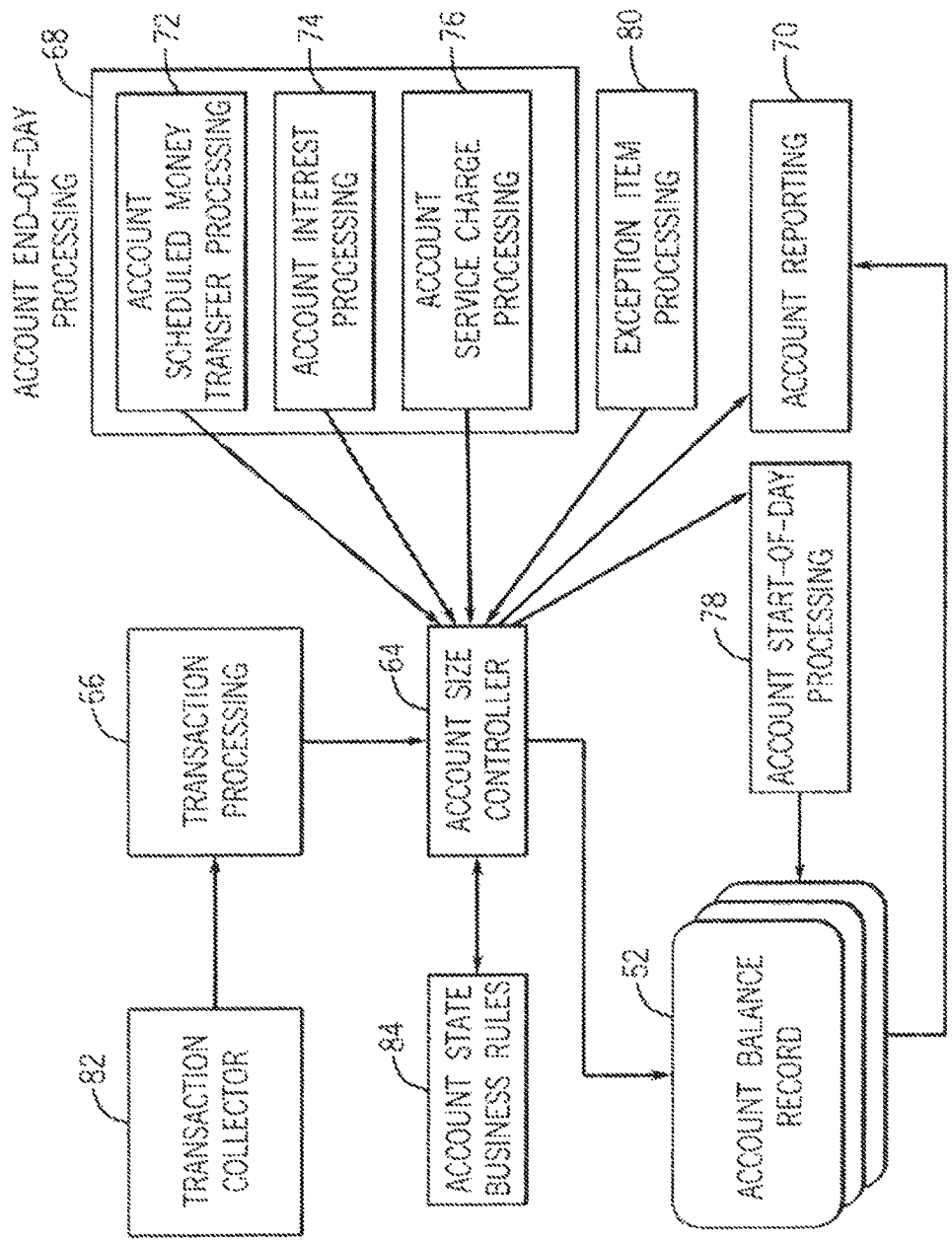
FIG. 5 is a schematic block diagram illustrating the connections between an account state controller and accounting system processes performed by a multiple balance state account processing system in accordance with the present invention.

As illustrated, for example, in FIG. 5, the account state controller 64 controls posting to the daily account balance records 52, specifically, to the daily account balances thereof, of daily transactions 66 and end-of-day transactions 68, such as end-of-day sweeps 72, interest 74, and service charges 76. The account state controller 64 also may control posting to the daily account balance records 52 of start-of-day 78 or opening transactions and exception items 80, if any. (Note that the timing and sequence of the posting of start-of-day 78 and exception items 80 by the account state controller 64 may be controlled by the account processing event manager 62. E.g., the account processing event manager 62 may initiate start-of-day processing by the account state controller 64.) The daily transactions 66 processed by the account state controller 64 may be collected in a transaction collector 82 and, as discussed above, processed either continuously or in batch mode by the account state controller 64 (as determined by the account processing event manager 62).

As discussed above, the account state controller 64 also controls the daily account balance record posting state of the daily account balance records 52. The daily account balance record posting state for each daily account balance record 52 is selected by the account state controller 64 based on account state business rules 84 in effect for each account. The account state business rules 84 are established for each account by the account owner (customer) and banking entity.

The account state controller 64 determines the account balance posting state of each daily account balance record 52 based on the account state business rules 84 established for the account by the customer and/or the banking entity. The business rules 84 establish the daily account balance posting state definitions (which transactions may be posted to a daily account record balance when a particular account balance posting state is assigned to that daily account balance record) as well as events that trigger the assignment of or change in the account balance posting state assigned to a particular daily account balance record 52. The account state business rules 84 may define several categories or definitions for event triggers that drive the account state controller 64 to establish or change the posting state of a daily account balance record 52 at any given point in time. Exemplary business rule categories for defining event triggers that drive the account state controller 64 to establish or change account balance posting states may include:

Date/Time Initiated—Business rules that initiate event triggers for daily account balance record posting state changes based on specific day, date, or time-of-day conditions (e.g., change daily account balance record posting state to "open for posting daily entries" at midnight).

Conditional/Threshold Initiated—Business rules that trigger events for daily account balance record posting state changes based on the value of defined system data attributes or the occurrence of a defined condition (e.g., change daily account balance record posting state to "closed for posting closing entries" after completion of end of day batch postings).

Operator Initiated—Business rule conditions allowing banking entity or customer operators to override other event triggers to initiate a daily account balance record posting state change for exceptional processing conditions (e.g., change daily account balance record posting state to "open for adjustments" to accommodate posting an adjustment to the daily account record balance after the daily account balance record has otherwise been closed to all postings).

Various types of business rules 84 employed by the account state controller 64 to trigger the establishment or change of daily account balance record posting states may fall into one or more of the listed categories. Moreover, the account state controller 64 in accordance with the present invention may base the triggering of the establishment or change of account balance record posting states on business rules 84 which may not fall into one of the exemplary business rule categories listed above.

Figure 6:
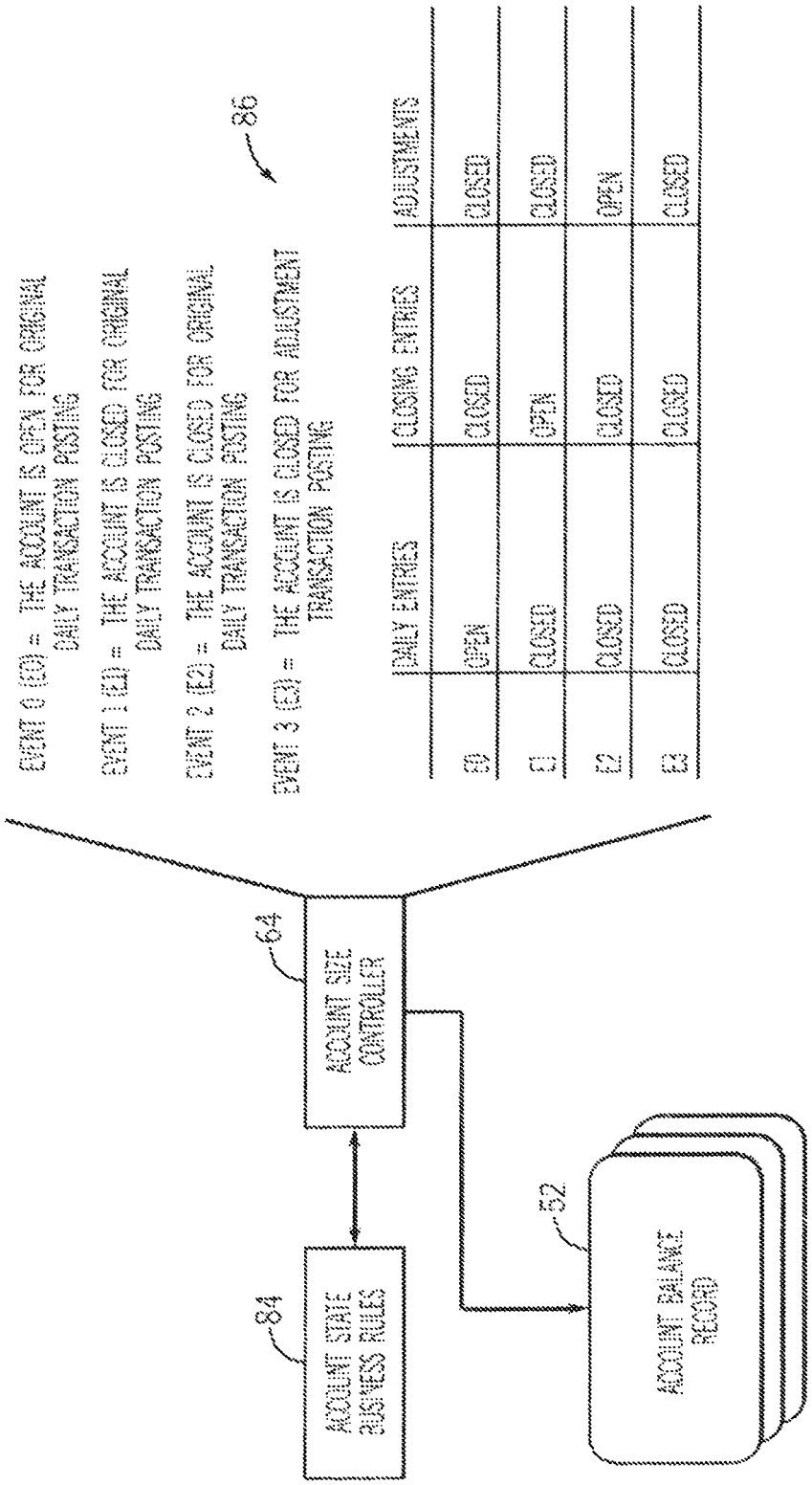
FIG. 6 is a an exemplary state table showing the processing state for a daily account balance record in a multiple balance state account processing system in accordance with the present invention. The state table is created by trigger events initiating a state determination process, which uses the trigger events and business rules to determine the appropriate state for the account and update the state table accordingly.

As illustrated in FIG. 6, the account state business rules 84 employed by the account state controller 64 may be incorporated into a state table 86 which defines the account balance posting states that are to be assigned to a daily account balance record 52 in response to the occurrence of various trigger event conditions. The same account posting state table 86 may be employed for each of the daily account balance records 52 defining an individual account, or for sets of related accounts, which are subject to the same account state business rules. Of course, different business rules 84 for different accounts, sets of accounts, or even for different daily account balance records within the same account, will result in different account posting state tables. For the exemplary daily account balance posting state table 86 illustrated in FIG. 6, the account state business rules 84 employed by the account state controller 64 define four triggering events E0-E3, each of which will drive the account state controller 64 to establish a different daily account balance record posting state for a daily account balance record 52. For example, the occurrence of trigger event E0 drives the account state controller 64 to establish a daily account balance record posting state for the relevant daily account balance record 52 of open for posting of daily transaction entries and closed for posting of closing (or end-of-day) and adjustment transaction entries. The occurrence of trigger event E1 drives the account state controller to 64 to establish a daily account balance record posting state for the daily account balance record 52 of closed for posting of daily and adjustment transaction entries and open for posting of closing (or end-of-day) transaction entries. The occurrence of trigger event E2 drives the account state controller 64 to establish a daily account balance record posting state for the daily account balance record 52 of closed for posting of daily and closing (end-of-day) transaction entries and open for posting of adjustment transaction entries. The occurrence of trigger event E3 drives the account state controller 64 to establish a daily account balance record posting state for the daily account balance record 52 of closed for daily, closing (end-of-day), and adjustment transaction entries.

Figure 7:
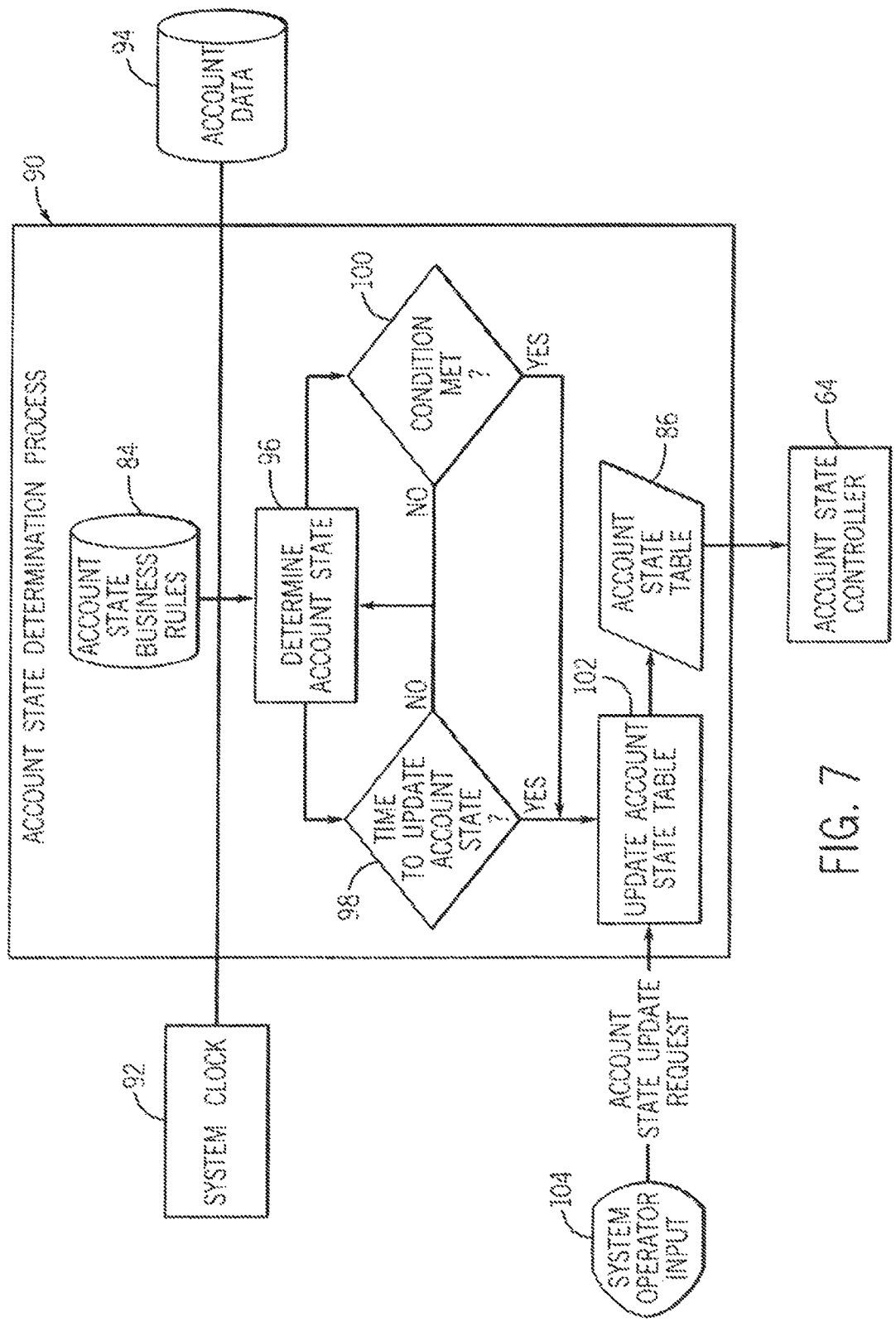
FIG. 7 is a flow chart diagram illustrating an exemplary account state determination process performed by an account state controller of a multiple balance state account processing system in accordance with the present invention.

An exemplary account state determination process 90, which may be employed by an account state controller 64 to assign an account balance posting state to a daily account balance record 52 in accordance with the present invention, will be described with reference to the exemplary flow chart diagram of FIG. 7. As discussed above, changes in daily account balance record posting states may be initiated by date/time based or conditional/threshold based triggering events. To determine if a date/time based triggering event has occurred, date/time information provided by a system clock 92 is provided as an input to the account state determination process 90. To determine if a conditional/threshold based triggering event has occurred, account data 94 is provided as an input to the account state determination process 90. Based on the account state business rules 84 in effect for the particular daily account balance record under consideration, a determination of the appropriate daily account balance posting state is made at 96. If either the time/date information provided by the system clock 92 indicates that it is time to update the daily account balance record posting state 98 or the account data 94 indicates that a particular account condition or threshold trigger has been satisfied 100, the account state controller 64 updates 102 the daily account balance record posting state for the daily account balance record, e.g., by transitioning to the appropriate daily account balance record posting state in the account posting state table 86 based on the triggering event which has occurred. If no such triggering event occurs, no change is made to the daily account balance record posting state until such a triggering event occurs. As discussed above, a change to the daily account balance record posting state preferably also may be operator initiated, e.g., by a system operator providing the appropriate system input 104 to request a daily account balance record posting state update.

Figure 8:
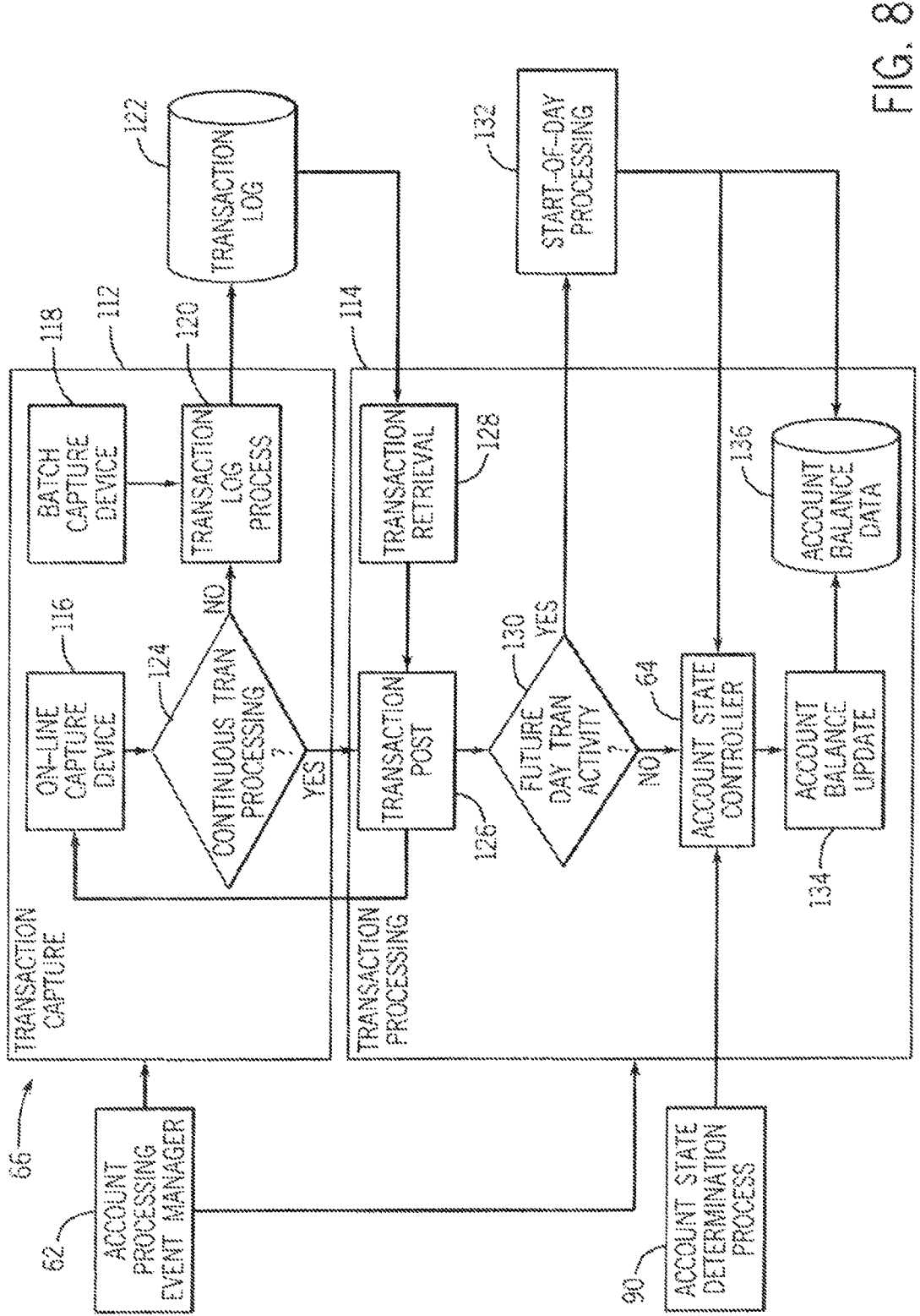
FIGS. 8 and 9 are flow chart diagrams illustrating an exemplary account processing method for posting transactions as may be performed by a multiple balance state account processing system in accordance with the present invention.

An exemplary transaction posting process 66 for posting transactions to accounts in a multiple balance state account processing system and method in accordance with the present invention will be described with reference to the exemplary flow chart diagrams of FIGS. 8 and 9. Beginning with FIG. 8, as discussed above, an account processing event manager 62 controls the overall timing and sequence of account transaction capture 112 and account transaction processing 114. Account transaction capture 112 is the gathering of the various transactions that are to be applied to an account. Some transactions that are to be applied to an account may be captured continuously, or in real-time. For example, an on-line capture device or system 116 may capture electronic transactions (e.g., ATM and POS transactions) affecting an account balance as the transactions occur. Other transactions affecting an account balance may be received via a batch capture device 118. For example, paper check transactions affecting an account balance may be entered in batches, e.g., once a day. All transactions received by the batch transaction capture device 118 are logged by a transaction log process 120 in a transaction log 122 for batch processing. Transactions captured in real-time, or near real-time, by the on-line capture device 116, may be processed continuously, as the transactions are received, or may be logged for later batch processing. If the account processing event manager 62 determines at 124 that incoming transactions from the on-line capture device 116 are to be processed continuously, the transactions from the on-line capture device 116 are forwarded directly for transaction processing 114. However, if the account processing event manager 62 determines at 124 that the transactions from the on-line capture device 116 are to be processed later in a batch, the transactions from the on-line capture device 116 are logged by the transaction log process 120 in the transaction log 122.

The account processing event manager 62 also controls the timing and sequence of account transaction processing 114. At the core of account transaction processing 114 is transaction posting 126. Transaction posting 126 is the application of an account balance affecting transaction to the appropriate daily account record balance, and the updating of the daily account record balance in response thereto. As discussed above, under control of the account processing event manager 62, transaction posting 126 may be performed either continuously, as transactions to be posted are received by the system, or in a batch process. For continuous transaction posting, the transactions to be posted are forwarded directly to the transaction posting process 126 for posting. For batch transaction posting, at the appropriate time for batch posting, as determined by the account processing event manager 62, the transactions logged for batch posting in the transaction log 122 are retrieved 128 and provided to the transaction posting process 126 for posting. Transactions retrieved 128 from the transaction log 122 for batch posting may be posted to accounts using the same process as transactions which are posted continuously to accounts.

As discussed above, in accordance with the present invention, each transaction to be posted to a customer account is defined by an account designation as well as a transaction date (or other temporal indication) and a transaction type. If a transaction presented to the transaction posting process 126 for posting is for an account and day for which a daily account balance record has already been established, attempted posting of the transaction to the daily account balance record based on the transaction type and daily account balance record posting state may proceed, as will be discussed in more detail below. If, however, a determination is made at 130 that the transaction to be posted is for an account and day (e.g., for a future day) for which a daily account balance record has not been established, a start-of-day processing sequence 132 may be initiated. The start-of-day processing sequence 132 establishes a daily account balance record for the account and day indicated in the transaction to be posted. As part of the start-of-day processing sequence 132, a daily account balance posting state for the new daily account balance record is established, based on the account state business rules in affect for the account, e.g., by the account state controller 64 initiating the account state determination process 90. A start-of-day or opening balance for the daily account balance record also may be established as part of the start-of-day processing sequence 132.

If a transaction to be posted is for an established daily account balance record, or after a new daily account balance record is established by the start-of-day processing sequence 132 for a transaction for which a daily account balance record had not previously been established, processing control is passed to the account state controller 64, which controls the transaction posting 126 and an account balance update 134 process. By the account balance update process 134, if, depending upon the transaction type and current daily account balance record posting state, a transaction of the appropriate type is posted successfully to a daily account balance record by the transaction posting process 126, the account balance data 136 for the account is updated accordingly.

Figure 9:
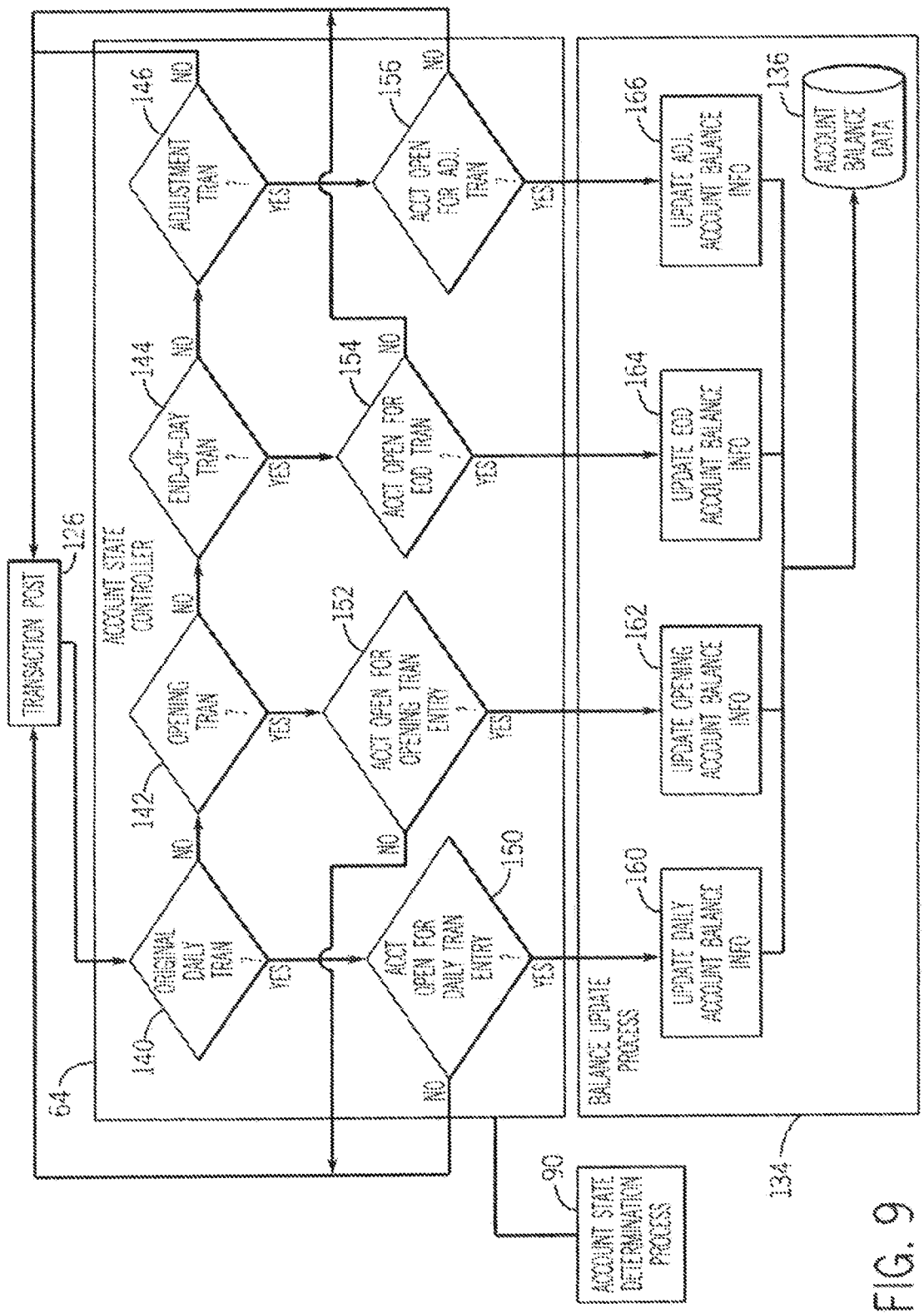

An exemplary transaction posting 126 and balance update 134 process, as controlled by an account state controller 64 in accordance with the present invention, is illustrated by the exemplary flow-chart diagram of FIG. 9. Transaction posting 126 in accordance with the present invention begins with a determination of the transaction type. The transaction type indication is examined to determine the type of transaction to be posted. For example, a determination may first be made whether the transaction to be posted is a daily transaction entry 140, an opening transaction entry 142, an end-of-day (or closing) transaction entry 144, or an adjustment transaction entry 146. If the transaction is a transaction of a type which is not recognized by the system, the transaction cannot be posted. In such a case, the system may provide a notification to the system operator, who may take appropriate action in response thereto. For example, the operator may assign a recognizable transaction type to the transaction or may modify the transaction posting process 126 to recognize the given transaction type as provided. Until the transaction type is changed to a recognizable transaction type, or the transaction posting process 126 is changed to recognize the previously unrecognized transaction type, a transaction of an unrecognized transaction type cannot be posted. Pre-processing of all received transactions may be performed prior to forwarding such transactions to the transaction posting process 126, to confirm that all transactions to be processed are of a recognizable transaction type. Received transactions of unrecognizable transaction types may be assigned automatically appropriate recognizable transaction types based on pre-established transaction type translation or assignment rules.

After having determined the type of the transaction to be posted, a determination is made whether or not the daily account balance record for the date of the transaction is open to posting of transactions of that particular transaction type. The determination may be made based on the daily account balance posting state established for the daily account balance record by the account state controller 64 during the account state determination process 90, as discussed in detail above. If the daily account balance posting state indicates that the daily account balance record is open for posting of the transaction to the daily account balance, the appropriate daily account balance may be updated by the balance update process 134. For example, as illustrated in FIG. 9, if the transaction to be posted is a daily transaction entry 140, and the daily account balance record is open to posting of daily transaction entries 150, the daily account balance may be updated 160 by the transaction amount by the balance update process 134. If the transaction to be posted is an opening transaction entry 142, and the daily account balance record is open to posting of opening transaction entries 152, the appropriate daily account balance may be updated 162 by the transaction amount by the balance update process 134. If the transaction to be processed is an end-of-day (closing) transaction entry 144, and the daily account balance record is open to posting of end-of-day (closing) transaction entries 154, the appropriate daily account balance may be updated 164 by the transaction amount by the balance update process 134. If the transaction to be processed is an adjustment transaction entry 146, and the daily account balance record is open to posting of adjustment transaction entries 156, the appropriate daily account balance may be updated 166 by the transaction amount by the balance update process 134. Any update of a daily account balance by the balance update process 134 affects an appropriate change in the account balance data 136 for the account.

If the daily account balance posting state indicates that the daily account balance record is closed to posting of a transaction of a particular type which is attempted to be posted, the transaction cannot be posted to the daily account balance record at that time. In such a case, the transaction posting process 126 may continue to attempt to post the transaction to the daily account balance record until a change in the daily account balance record posting state, which may be initiated by the account state controller 64 in response to a triggering event, as discussed above, results in a daily account balance record posting state which allows the transaction to be posted. Alternatively, the posting process 126 may attempt to post the transaction to the daily account balance record for the next business day, if the daily account balance record for the next business day is open to the posting of transactions of the given transaction type. For example, a daily transaction for Day N which cannot be posted to a daily account balance record for Day N, because the daily account balance record for Day N is closed to posting of daily transactions, may be posted to the daily account balance record for the next business day (e.g., Day N+1) if the daily account balance record posting state for the daily account balance record for the next business day indicates that the daily account balance record for the next business day is open to posting of daily transactions. The response of the transaction posting process 126 to the attempted posting of a transaction which cannot be posted to a daily account balance record, because the daily account balance record posting state indicates that the daily account balance record is closed to posting of transactions of the transaction's type, may depend upon the type of the transaction attempted to be posted.

As discussed above, in addition to controlling the timing and sequence of account transaction capture and processing, the account processing event manager 62 may control the initiation and timing of end-of-day account processing 68. During end-of-day account processing 68, certain transactions that affect account balances, but which are generated internally, rather than being received from external to the system and captured thereby, are initiated. Such transactions which may be initiated during the end-of-day processing 68 may include, for example, scheduled money transfers 72 (e.g., pre-scheduled and defined sweeps), interest processing 74, service charge processing 76, and the like. (Additionally, account maintenance processes which do not affect account balances may be performed during the end-of-day processing 68.)

Figure 10:
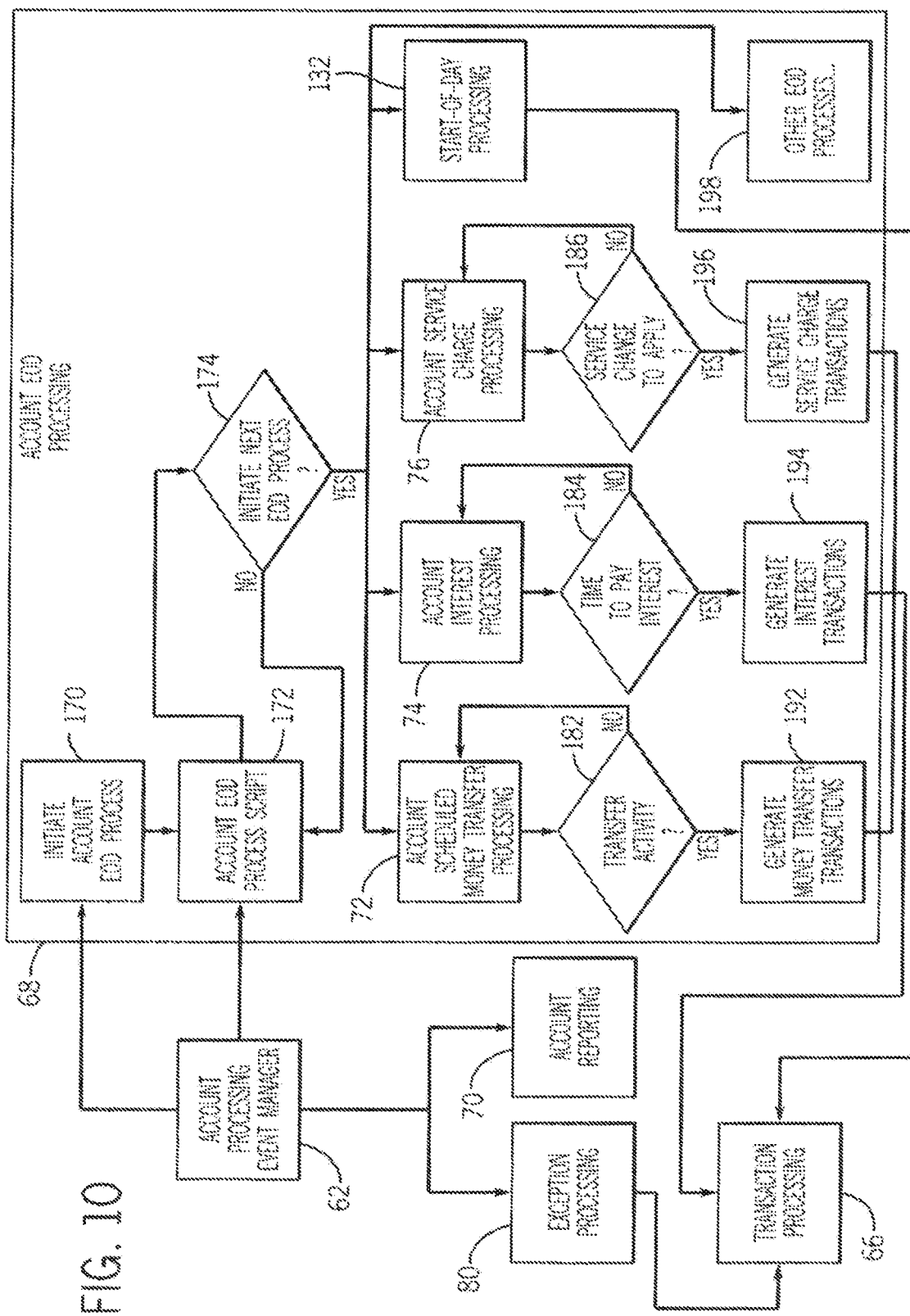
FIG. 10 is a flow chart diagram illustrating an exemplary end-of-day account processing method as may be performed by a multiple balance state account processing system in accordance with the present invention.

An exemplary method for end-of-day account processing 68 in accordance with the present invention, controlled by an account processing event manager 62, is illustrated in the exemplary flow chart diagram of FIG. 10. The account processing event manager 62 initiates 170 the end-of-day account processing 68 at an appropriate time. For example, the account processing event manager 62 may initiate 170 the end-of-day account processing 68 at a pre-scheduled time at the end of each business day. An end-of-day account processing script 172 may define the processes that are to be performed during end-of-day account processing 68, once end-of-day processing 68 is initiated 170. Different end-of-day account processing scripts 172 may be applied to different customer accounts or groups of accounts, depending, e.g., upon the account type and the processing to be applied to the account, as agreed upon between the customer and the banking entity. Each end-of-day account processing process defined in the end-of-day account processing script 172 is initiated 174 in sequence until the end-of-day account processing script 172 is executed fully.

Exemplary processes initiated during end-of-day processing 68 include scheduled money transfer (sweep) processing 72, account interest processing 74, and account service charge processing 76. As discussed above, sweeps are pre-defined transfers of money between accounts. Sweeps may be defined so as to be performed at specific pre-defined times, or if specific account conditions are satisfied. During end-of day account processing 68 a determination 182 may be made whether the appropriate sweep time has arrived or sweep conditions have occurred. If the conditions for a sweep transfer of funds are satisfied, a money transfer transaction 192 is generated. The generated sweep transaction 192 is forwarded for transaction processing 66 in the manner described above. Account interest processing 74 is initiated periodically during end-of-day account processing 68 at a frequency determined by agreement between the customer and banking entity. For example, interest may be applied to an account balance daily, monthly, etc. During end-of-day account processing 68, a determination 184 may be made whether the time to pay interest to the customer account has arrived. If the time to pay interest has occurred, an interest payment may be calculated and an interest payment transaction 194 generated. The generated interest payment transaction 194 is forwarded for transaction processing 66 in the manner described above. Similarly, account service charge processing 76 is initiated during end-of-day account processing 68 periodically and/or if specific account conditions are satisfied (e.g., service charges applied monthly if the average account balance is below a certain amount). Thus, during end-of-day account processing 68, a determination 186 may be made whether the time and/or conditions for applying service charges to an account balance have occurred. If the time and/or conditions for applying service charges have occurred, service charges may be calculated and a service charge transaction 196 generated. The generated service charge transaction 196 is forwarded for transaction processing 66 in the manner described above.

The money transfer 192, interest 194, and service charge 196, transactions generated during end-of-day account processing 68 may be assigned an appropriate transaction type for transaction processing 66 in the manner described above. For example, since these transactions are generated during end-of-day account processing, they may, but need not, be typed as closing or end-of-day transactions. Alternatively, it may be appropriate to type some of the transactions initiated during end-of-day processing 68 as start-of-day or opening transactions for the next business day. For example, it is conceptually more accurate to type interest and service charge transactions based on end-of-day account balances as start-of-day or opening transactions for the next business day. Such transactions thus are not applied to account balances until a daily account balance record is opened for posting of opening transactions for the next business day, and therefore need not affect the very closing balance on which they are based. Since a multiple balance state account processing system and method in accordance with the present invention allows the daily account balance posting state for the next business day to be established to allow posting of opening transactions to the daily account balance for the next business day at any time, such posting can occur immediately following the calculation of an interest payment or service charge, in response to the generated interest 194 or service charge 196 transaction. Thus, in accordance with the present invention, interest and service charges may be posted (and available for reporting) for a business day at the start of the business day.

Another process that may be initiated during end-of-day account processing 68 is start-of-day processing 132 for the next business day. As discussed above, start-of-day processing 132 for the next business day may include establishing a daily account balance record for the next business day, if a daily account balance record for the next business day has not already been established. Start-of-day processing 132 for the next business day also may include establishing an initial daily account balance posting state for the daily account balance record for the next business day. As discussed above, the daily account balance posting date for the next business day may be established by the account state controller, based on account state business rules in affect for the account.

Other end-of-day account processing processes 198, as defined by the end of day account processing script 172, also may be initiated during end-of-day account processing 68.

Figure 11:
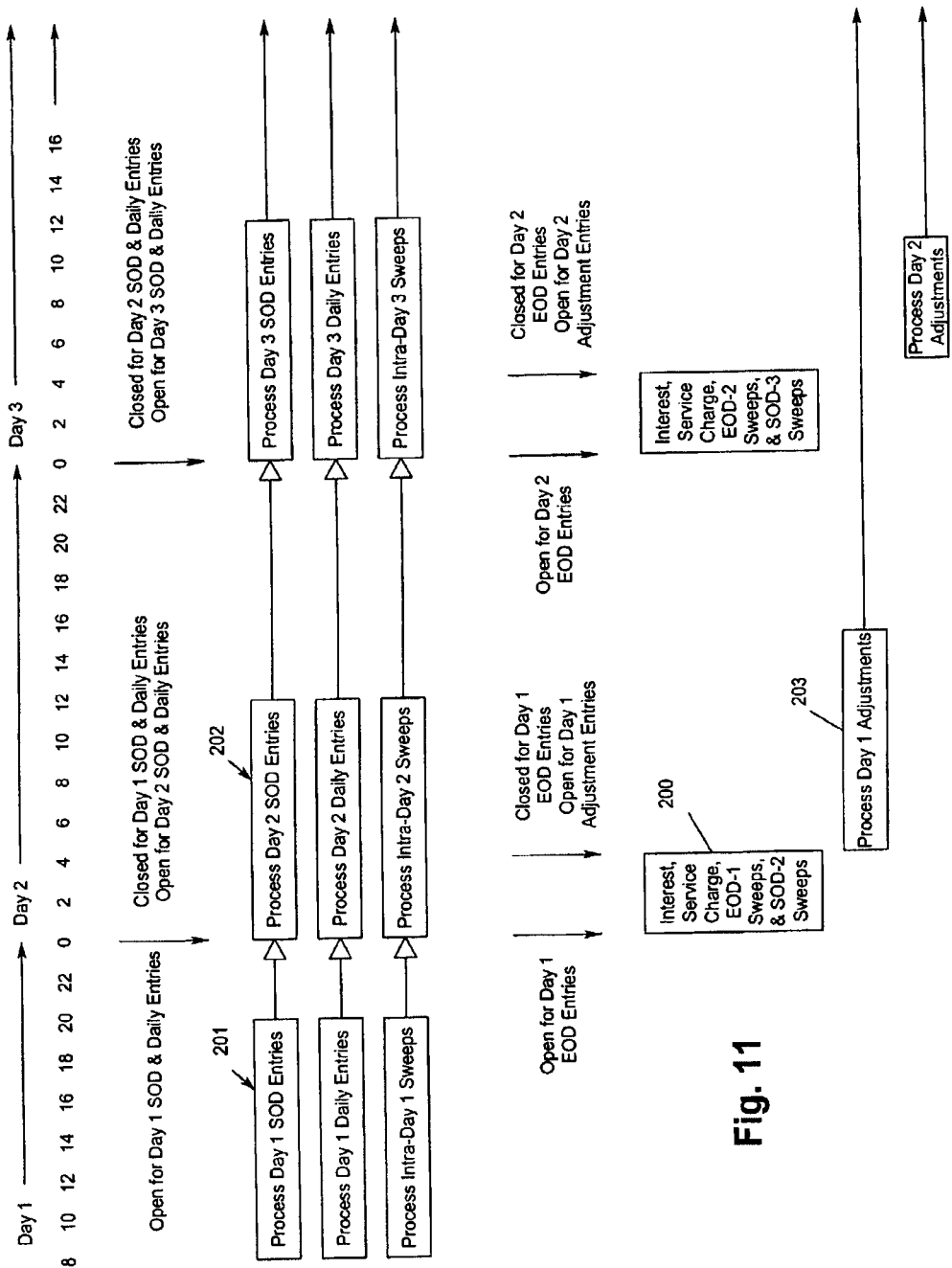
FIG. 11 is a timeline diagram illustrating an exemplary start-of-day, daily, end-of-day, and adjustment transaction processing sequence using multiple balance state account processing in accordance with the present invention.

FIG. 11 is an exemplary time-line for account processing as may be applied to a single exemplary deposit account in a multiple balance state account processing system in accordance with the present invention. In this case, the daily account balance record posting states of the daily account balance records defining the account are controlled such that interest, service charge, and end-of-day sweep transactions 200 for Day N are processed at the end of Day N, e.g., starting at midnight, at which time the account also is closed to processing of start-of-day, daily, and intra-day sweep transactions 201 for Day N. Simultaneously with the processing of end-of-day transactions for Day N, start-of-day, daily, and intra-day sweep transactions 202 for the account for Day N+1 may be processed. (The daily account balance record for Day N may be opened to the posting of adjustment transactions 203 for Day N after the account is closed to the posting of end-of-day transactions 200 for Day N.) Thus, in accordance with the present invention, an account may be open simultaneously to the posting of different types of transactions for different days. This is made possible by the use of an account defined by separate daily account balance records, including separate daily account balance record posting states which define the various types of transactions that may be posted to the account simultaneously for different days.

Figure 12:
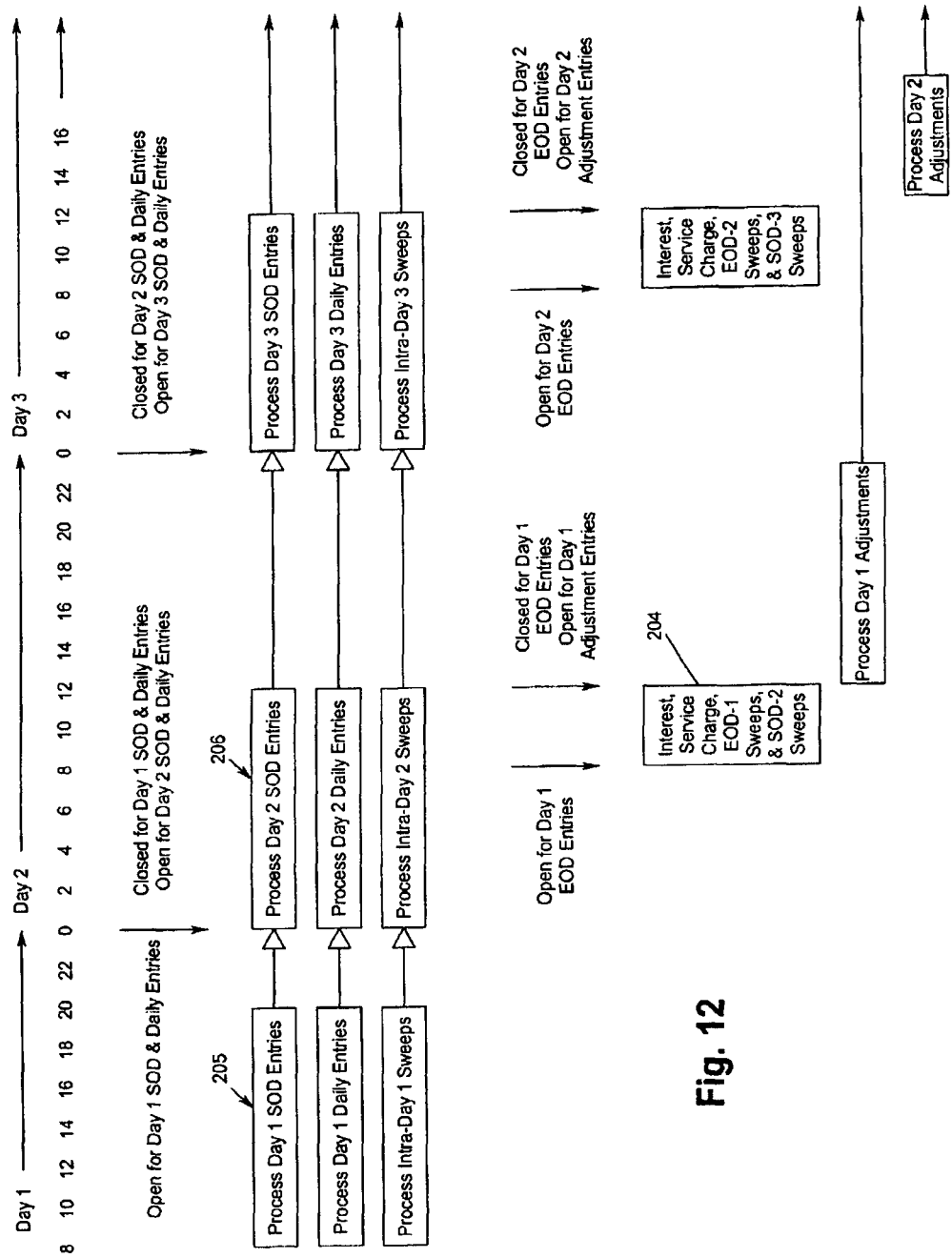
FIG. 12 is a timeline diagram illustrating an exemplary start-of-day, daily, end-of-day, and adjustment transaction processing sequence, with end-of-day transaction processing delayed, using multiple balance state account processing in accordance with the present invention.

As illustrated by the exemplary account processing time-line diagram of FIG. 12, in a multiple balance state account processing system in accordance with the present invention, the daily account balance record posting state may be controlled such that the account is open to the posting of end-of-day transactions 204, such as interest, service charge, and end-of-day sweep transactions, for Day N well after the account has been closed to the posting of daily transactions 205 for Day N and the account has been opened to the posting of daily transactions 206 for Day N+1. Thus, for example, processing of daily transactions 206 for Day N+1 may begin at midnight, with processing of end-of-day transactions 204 for Day N delayed until late in the morning of Day N+1. This scenario may be employed, for example, where it is desired to begin posting local daily transactions for Day N+1 while allowing the account to be opened for the posting of an end-of-day sweep from Day N, e.g., a sweep from an account in a different time zone where it is still Day N.

Figure 13:
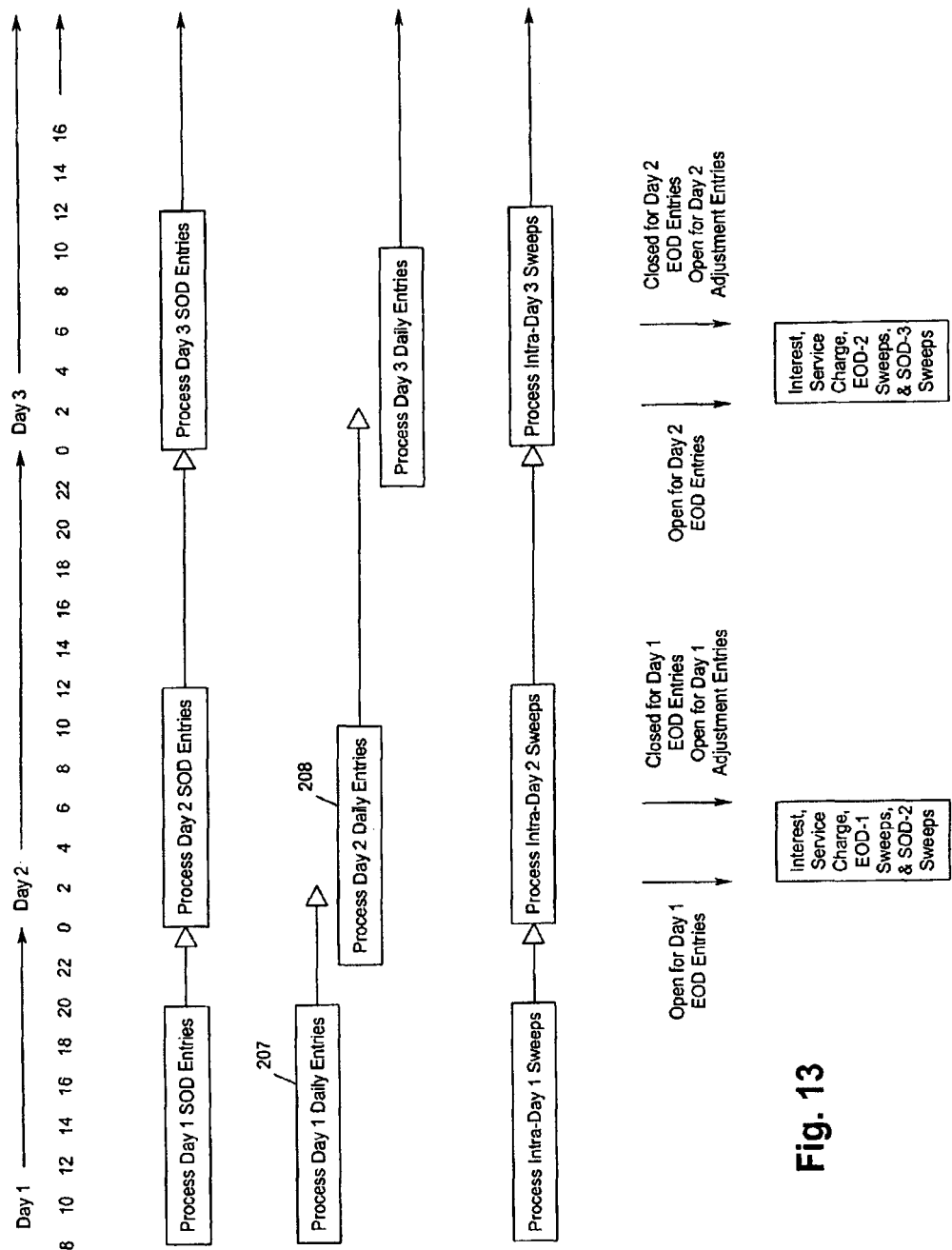
FIG. 13 is a timeline diagram illustrating an exemplary start-of-day, daily, end-of-day, and adjustment transaction processing sequence, with elongated daily transaction processing and with end-of-day transaction processing delayed, using multiple balance state account processing in accordance with the present invention.

As illustrated by the exemplary account processing time-line diagram of FIG. 13, in a multiple balance state account processing system in accordance with the present invention, the daily account balance record posting states of a daily account balance record may be controlled such that the account is open simultaneously to the posting of daily transactions for the current Day N 207 as well as for a future Day N+1 208. For example, the daily account balance record posting state for Day N+1 may be controlled to open the daily account balance record for Day N+1 to posting of daily transactions for Day N+1 late on Day N, while processing of Day N daily transactions is still ongoing. This allows for the early processing on Day N of post-dated daily transactions for Day N+1 or transactions affecting the account which may be initiated in a time zone where it is already Day N+1.

Figure 14:
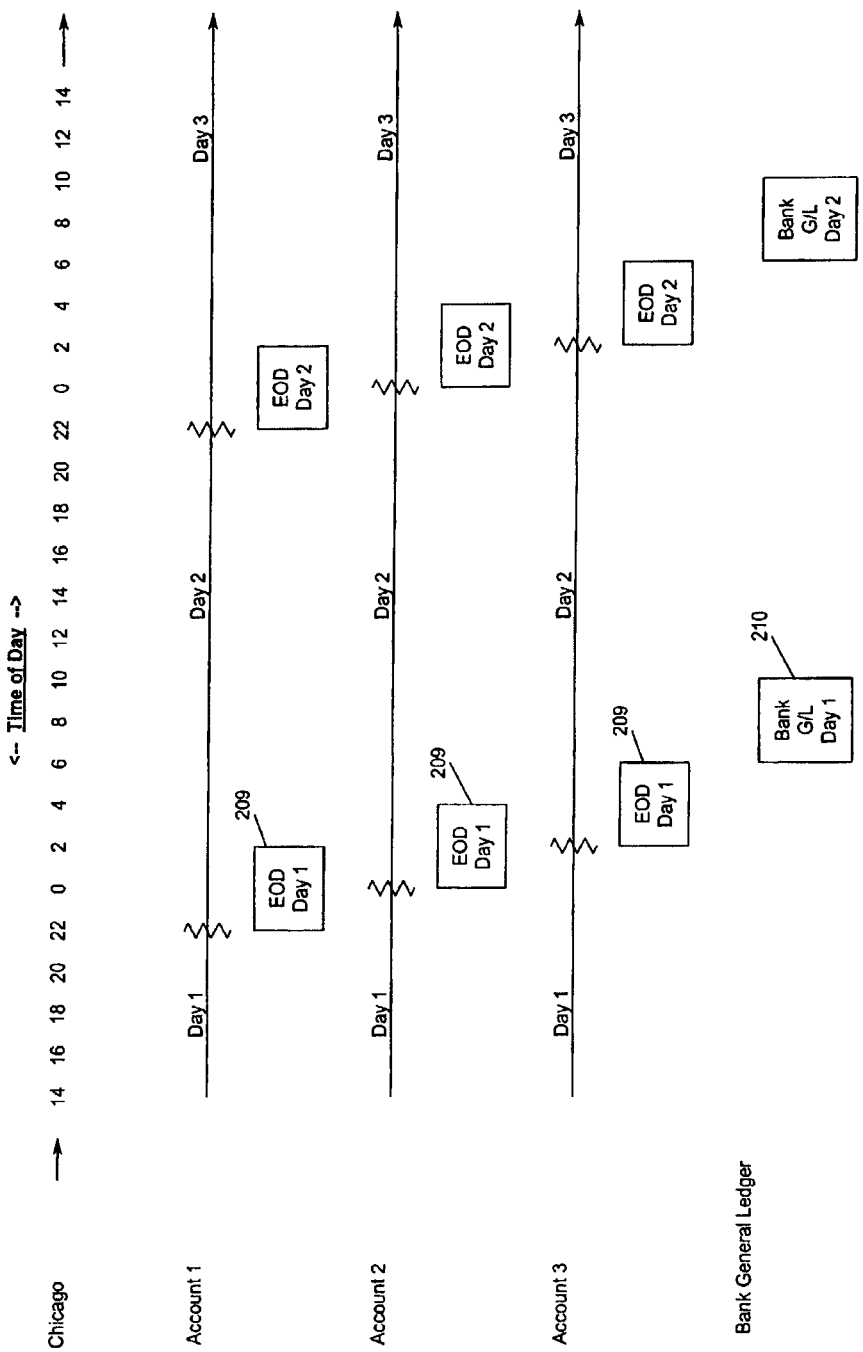
FIG. 14 is a timeline diagram illustrating end-of-day transaction processing scheduled at the account level using multiple balance state account processing in accordance with the present invention.

In a multiple balance state account processing system in accordance with the present invention, the types of transactions for which an account is open for processing is defined by each customer account itself. Thus, in accordance with the present invention, all of the accounts of a banking entity need not be processed during the same end-of-day batch processing period. As illustrated by the exemplary time-line diagram of FIG. 14, in a multiple balance state account processing system and method in accordance with the present invention, end-of-day transaction processing 209 for Day N for different accounts held by a banking entity may be performed at different times following the close of Day N. Different processing timing of different accounts held by a banking entity may be customer driven or banking entity driven. For example, a customer may want end-of-day processing for Day N for his account to be delayed, e.g., to allow for the posting of late Day N transactions from other time zones. Since, in accordance with the present invention, processing timing may be defined at the account level, such a customer request can be accommodated, without delaying processing of all of the other accounts held by the banking entity. The banking entity may select to perform end-of-day account processing for different accounts, or groups of accounts, held by the banking entity, at different times, to spread out processing, and thereby improve processing efficiency. Once end-of-day processing for Day N for all of the banking entity accounts is completed, the banking entity general ledger 210 for Day N, i.e., the position of the banking entity at the end of Day N considering all accounts held by the banking entity, may be established.

Figure 15:
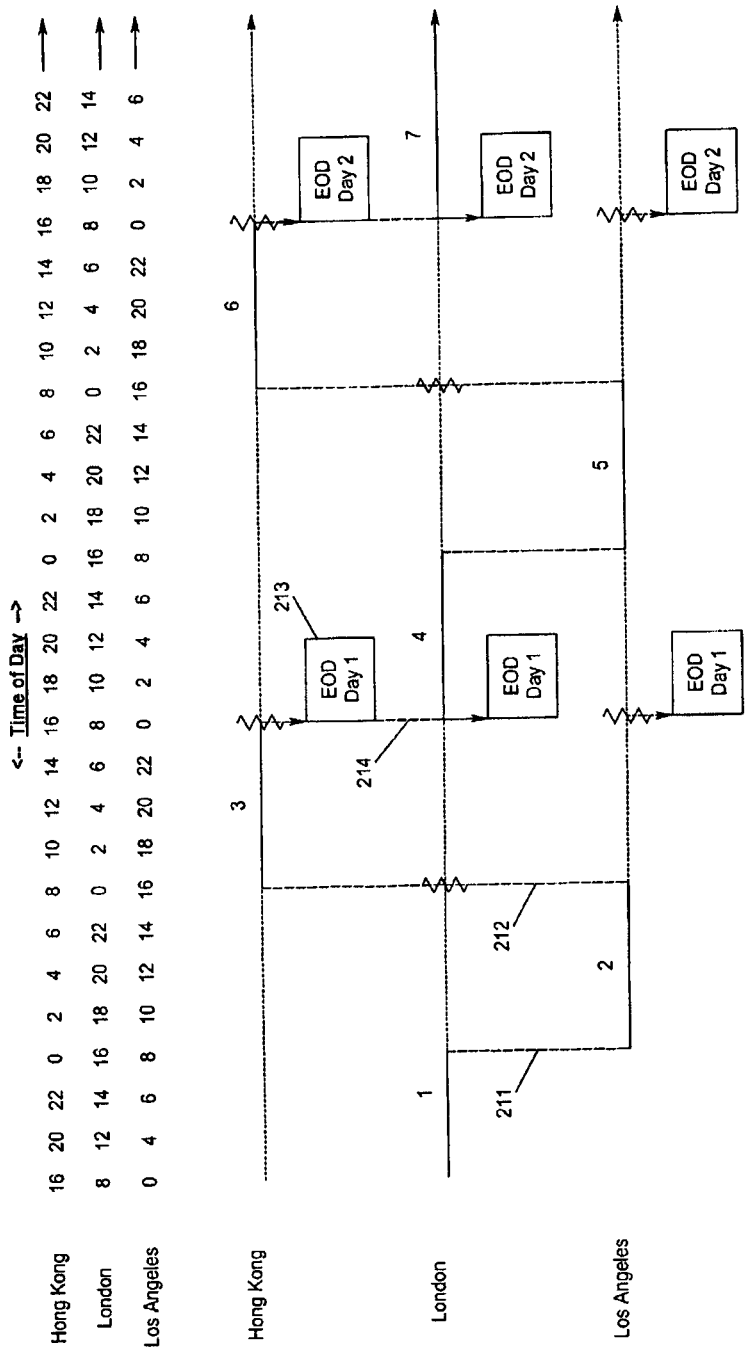
FIG. 15 is a timeline diagram illustrating inter-bank fund sweeping and funds availability for a global company using multiple balance state account processing in accordance with the present invention.

Multiple balance state account processing in accordance with the present invention provides banking entity customers with much greater flexibility in accessing and controlling money in their accounts. For example, the time-line diagram of FIG. 15 illustrates funds availability and funds transfer options made possible by the present invention for a global company with banking entity accounts in Hong Kong, London, and Los Angeles. (The solid numbered line in the figure indicates funds availability.) Funds originating in London may be transferred 211 (e.g., swept) to Los Angeles at the end of the business Day 1 in London. Such funds would then be available for use in Los Angeles on Day 1. At the end of the business Day 1 in Los Angeles the Day 1 funds from Los Angeles may be transferred 212 to Hong Kong. At this time it is already Day 2 in Hong Kong. However, in accordance with the present invention, the Day 1 funds from Los Angeles may be posted as Day 1 funds in Hong Kong, which are immediately available for use. This is made possible, in accordance with the present invention by keeping the daily account balance record for Day 1 for the account in Hong Kong open for end-of-day posting 213 of the Day 1 sweep from Los Angeles. (At the same time, the Hong Kong account may be open to the processing of Day 2 daily transactions.) At the end of the business Day 2 in Hong Kong the funds may be transferred 214 to London, for use there during Day 2. Thus, the present invention allows a single group of funds to be transferred between accounts such that the same funds are only in one place at any one time, but may be available locally for use during business hours throughout the world.

Figure 16:
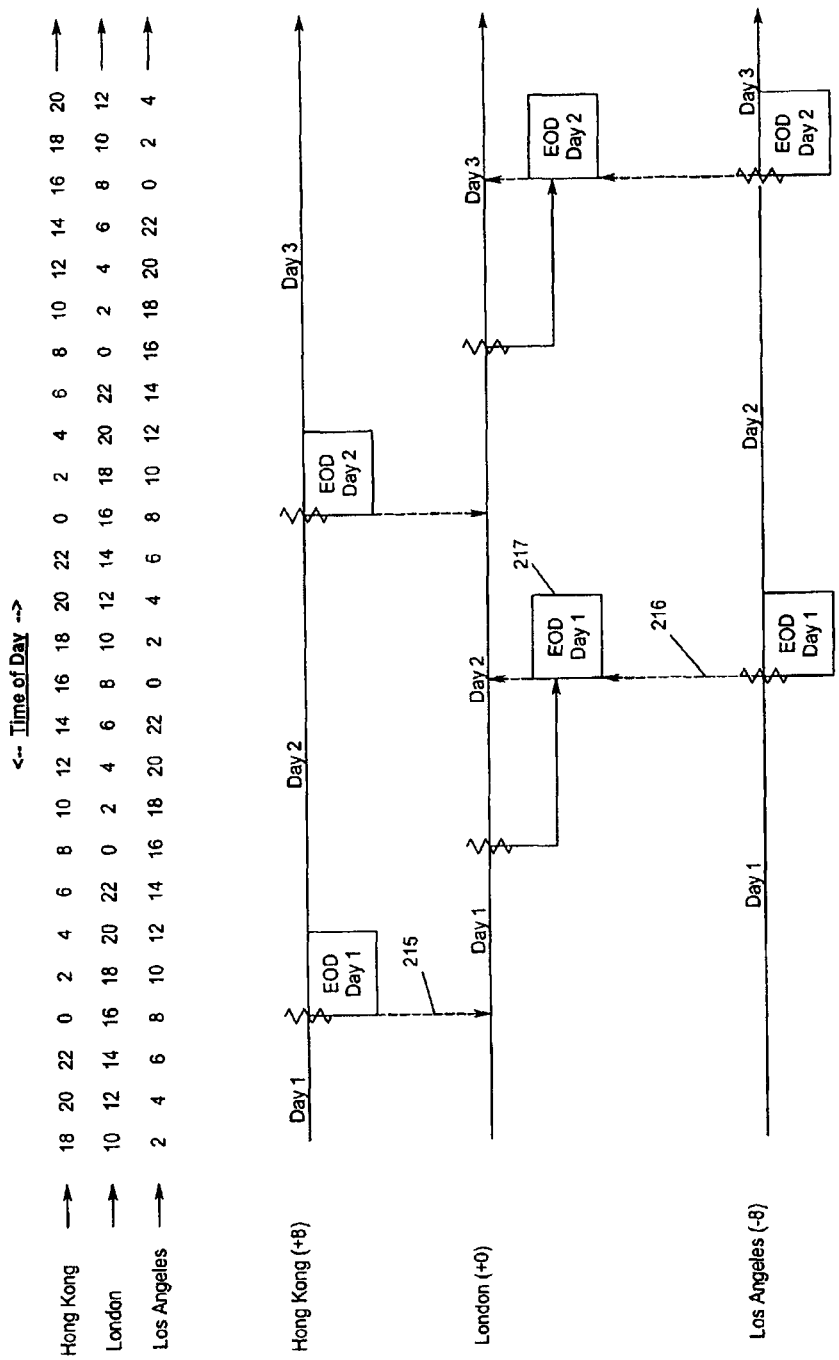
FIG. 16 is a timeline diagram illustrating central receipt processing for a global company using multiple balance state account processing in accordance with the present invention.

A multiple balance state account processing system in accordance with the present invention also facilitates central receipt processing in a global economy context. For example, FIG. 16 is a time-line diagram illustrating central receipt processing, made possible by a multiple balance state account processing system in accordance with the present invention, for a global company with a headquarters in London and operations in Hong Kong and Los Angeles. The company would like all receipts for all operations to be received in London at the end of each day. At the end of Day 1 in Hong Kong, the Hong Kong receipts for Day 1 may be transferred 215 to London, where it is still Day 1. At the end of Day 1 in Los Angeles, the Los Angeles receipts for Day 1 may be transferred 216 to London. Although it is now Day 2 in London, in accordance with the present invention, end-of-day processing 217 in London for Day 1 may be delayed, to allow posting of the Day 1 receipts from Los Angeles on Day 1, without delaying the beginning of Day 2 transaction posting in London.

Figure 17:
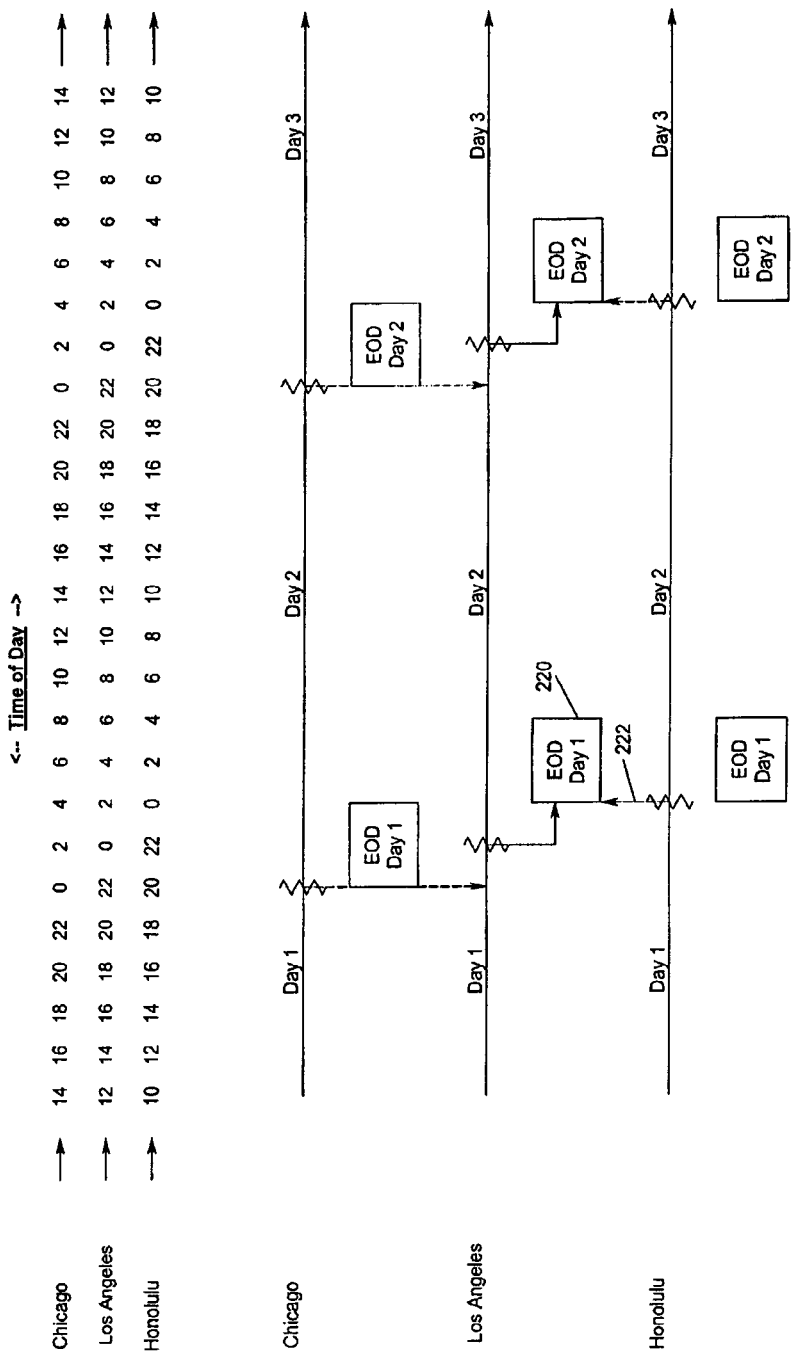
FIG. 17 is a timeline diagram illustrating retail nationwide banking with separate accounts at different locations using multiple balance state account processing in accordance with the present invention.

The advantages of customer funds availability and transfer flexibility provided by a multiple balance state account processing system in accordance with the present invention are not limited to global banking scenarios. For example, a national retailer with round-the-clock operations in Chicago, Los Angeles, and Honolulu may desire all funds from local accounts to be consolidated at the end of the day in the headquarter's account in Los Angeles. As illustrated in FIG. 17, in accordance with the present invention, the Los Angeles banking entity may delay end-of-day account processing 220 on Day 1 to allow for posting of Day 1 funds transferred 222 from Honolulu on Day 1 to the Day 1 account balance in Los Angeles. Since, in accordance with the present invention, account processing timing may be defined at the account level, delayed end-of-day processing 220 for the customer account in Los Angeles need not delay end-of-day processing of other customer accounts held by the same banking entity.

Figure 18:
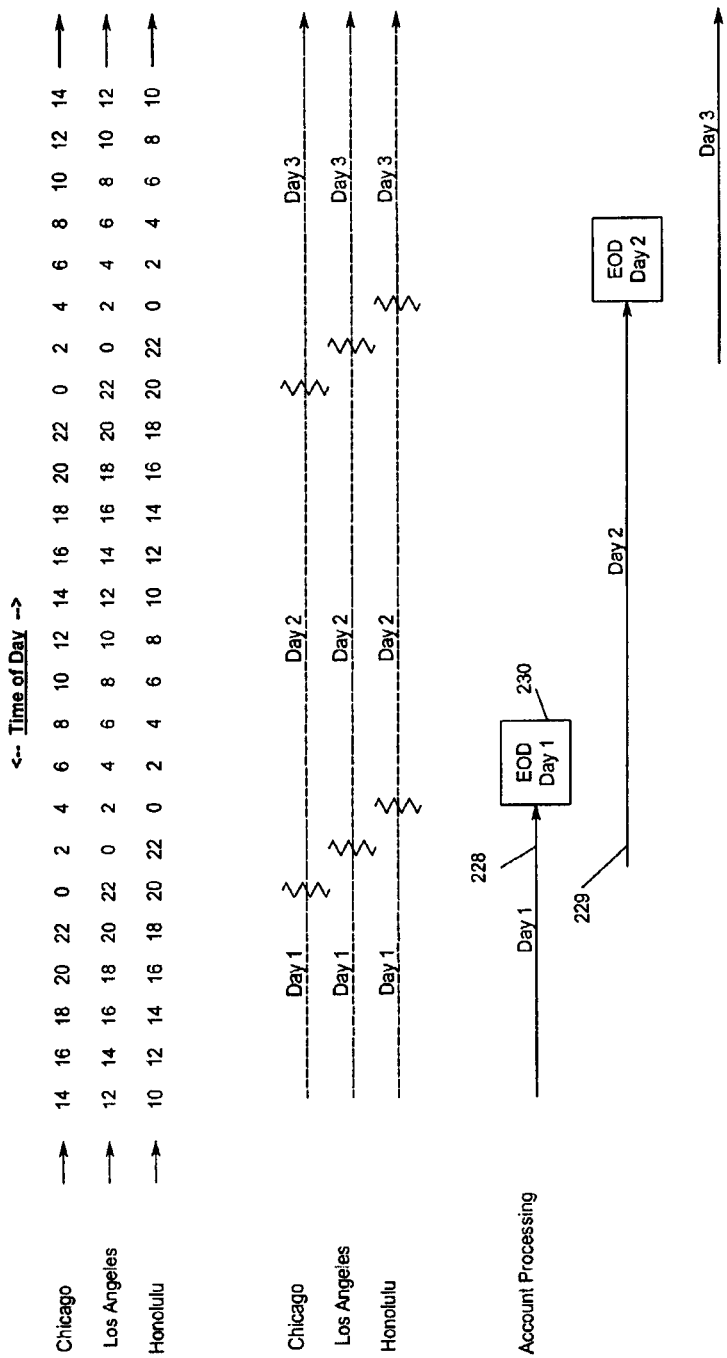
FIG. 18 is a timeline diagram illustrating retail nationwide banking with a single account accessible at multiple locations using multiple balance state account processing in accordance with the present invention.

Rather than having multiple accounts in each location in which the company does business, a company having operations throughout the country may wish to employ a single centralized account. For example, a company with round the clock operations in Chicago, Los Angeles, and Honolulu may have a single centralized account with a Los Angeles banking entity. In accordance with the present invention, the customer account is defined by multiple daily account balance records, each of which may be defined by a different daily account balance record posting state. Thus, as illustrated by the timeline diagram of FIG. 18, in accordance with the present invention, the customer account in Los Angeles may be open simultaneously to the posting of Day 1 transactions 228 originating in Honolulu and Day 2 transactions 229 originating in Chicago. End-of-day processing 230 for the account in Los Angeles is delayed until all Day 1 activity from all branches is completed.

It should be understood that the present invention is not limited to the particular exemplary embodiments and applications described herein, but embraces all variations thereof that come within the scope of the following claims.

What is claimed is:

1. A method for posting transaction entries implemented by at least one processor, comprising:
   establishing accounts via the processor, an established account having an account record stored in an account database, the account record comprising a plurality of daily account balance records,
   assigning, to an established account via the processor, a posting state identifying types of transaction entries to be posted to the daily account balance records of the established account, wherein the posting state specifies that a daily account balance record is open for posting of transaction entries of a first transaction entry posting type for a time period in which the posting state is assigned;
   receiving transaction entries via the processor, wherein a received transaction entry is associated with an established account and has a transaction entry posting type; and
   posting via the processor, a received transaction entry to a daily account balance record for the established account associated with the received transaction based upon an account posting state for the established account associated with the received transaction and a posting type of the received transaction entry.

2. The method of claim 1, wherein the time period is the entire time period in which the posting state is assigned.

3. The method of claim 1, wherein the posting state specifies that a daily account balance record is closed to posting of transaction entries of a second transaction entry posting time for the time period.

4. The method of claim 1,
   wherein the received transaction entry comprises a time period characteristic, and
   wherein posting the received transaction entry comprises posting the received transaction entry to the daily account balance record for the established account associated with the received transaction based upon:
      a posting state for the established account associated with the received transaction for a specified business day;
      a transaction entry posting type for the received transaction; and
      the transaction entry time period characteristic.

5. The method of claim 4, wherein the transaction entry time period characteristic comprises transaction entry dates and times.

6. The method of claim 4, wherein a posting state assigned to a first daily account balance record for a specific business day of an established account is different from a posting state assigned to a second daily account balance records for another business day of the established account.

7. The method of claim 1, wherein the posting state assigned to a first one of the established accounts is different than the posting state assigned to a second one of the established accounts.

8. The method of claim 1, wherein:
   assigning a posting state is based upon business rules; and
   the method further comprises changing posting states assigned to established accounts based upon the business rules in response to triggering events.

9. The method of claim 1,
   wherein a transaction entry posting type assigned to the received transaction entry is selected from a group of transaction entry posting types comprising daily entries, opening entries, closing entries, and adjustments, and
   wherein posting states assigned to the established account associated with the received transaction comprise a posting state in which a daily account balance record has one or more of the following statuses:
      open for posting opening entries;
      closed for posting opening entries;
      open for posting daily entries;
      closed for posting daily entries;
      open for posting closing entries;
      closed for posting closing entries;
      open for posting adjustments; or
      closed for posting adjustments.

10. The method of claim 1, wherein receiving transaction entries further comprises logging a transaction entry for batch posting, and wherein posting a received transaction entry further comprises posting the logged transaction entry to the established associated with the received transaction in a batch.

11. The method of claim 1, wherein posting further comprises posting at least one of the received transaction entries to the established accounts within a specified time period after receipt of the at least some received transaction entries.

12. The method of claim 1, further comprising assigning to the established account a posting state for a business day and wherein the assigned posting state changes as a function of time and defines types of transaction entries to be posted to daily account balance records for the established account.

13. The method of claim 12, wherein the assigned posting state prevents posting of a transaction entry to a daily account balance record for one day if the transaction entry has been posted to a daily account balance record for a previous consecutive business day.

14. A system for posting transaction entries, comprising:
   an account database configured to store established accounts having an account record comprising a plurality of daily account balance records;
   a memory containing stored instructions; and
   at least one processor coupled to the memory and the account database and executing the instructions to:
      associate a received transaction entry with an established account, the received transaction entry having a transaction entry posting type; and
      assign a posting state to the established account,
         the account posting state indicating a daily account balance record to which a received transaction entry assigned to the established account will be posted based on the transaction entry posting type of the received transaction, wherein the account posting state specifies that a daily account balance record is open for posting of transaction entries of a first transaction entry posting type for a time period in which the posting state is assigned; and post a received transaction entry daily account balance for an established account associated with the received transaction entry based upon a posting state of the established account associated with the received transaction entry and the transaction entry posting type of the received transaction entry.

15. The system of claim 14, wherein the time period is the entire time period in which the posting state is assigned.

16. The system of claim 14, wherein the posting state specifies that a daily account balance record is closed to posting of transaction entries of a second transaction entry posting time for the time period.

17. The system of claim 14, wherein the stored instructions further comprise instructions executable by the processor to:

assign a daily posting state to the daily account balance record of the established account, wherein the daily posting state changes as a function of time and indicates transaction entry posting types to be posted to the daily account balance record, and wherein the received transaction entry comprises a time period characteristic, and post a received transaction entry daily account balance record for the established account associated with the received transaction entry based upon at least one of:
the posting state of the daily account balance record;
the transaction entry posting type of the received transaction entry; and
the transaction entry time period characteristic.

18. The system of claim 17, wherein the transaction entry time period characteristic comprises transaction entry dates and times.

19. The system of claim 14, wherein assign a posting state further comprises assigning a first posting state to a first established account that is different from a second posting state assigned to a second established account.

20. The system of claim 14, wherein assign a posting state further comprises assigning posting states to an established account based upon business rules.

21. The system of claim 14, wherein the stored instructions further comprise instructions executable by the processor to receive transaction entries for posting to the established accounts and to log at least some of the received transaction entries for batch posting.

\* \* \* \* \*